United States Patent [19]

Pappas et al.

[11] 4,319,220

[45] Mar. 9, 1982

[54] ALARM SYSTEM FOR MONITORING PRESSURIZED VEHICULAR TIRES

[75] Inventors: Dennis G. Pappas, 200 E. 58th St., New York, N.Y. 10022; Matthew C. Baum, Westwood, N.J.; Samuel N. Small, Valley Stream, N.Y.; Robert T. Adams, Short Hills, N.J.; Robert P. Freedman, East Northport, N.Y.

[73] Assignee: Dennis G. Pappas, New York, N.Y.

[21] Appl. No.: 928,526

[22] Filed: Jul. 27, 1978

Related U.S. Application Data

[62] Division of Ser. No. 719,325, Aug. 31, 1976, Pat. No. 4,126,772.

[51] Int. Cl.$^3$ ............................................. B60C 23/06
[52] U.S. Cl. ................................... 340/58; 200/61.23
[58] Field of Search ............ 340/58; 200/61.22, 61.23, 200/61.25, 61.26

[56] References Cited

U.S. PATENT DOCUMENTS

| | | | |
|---|---|---|---|
| 3,699,367 | 10/1972 | Thomas | 310/69 |
| 3,723,966 | 3/1973 | Mueller et al. | 340/58 |
| 3,760,351 | 9/1973 | Thomas | 340/58 |
| 3,787,806 | 1/1974 | Church | 340/58 |
| 3,810,090 | 5/1974 | Davis, Jr. et al. | 340/58 |
| 4,160,234 | 7/1979 | Karbo et al. | 340/58 |

Primary Examiner—Alvin H. Waring
Attorney, Agent, or Firm—Pennie & Edmonds

[57] ABSTRACT

Alarm system for monitoring pressurized vehicular tires for their gas mass, basically comprising a wheel unit for at least some of the tires of the vehicle, and a common receiver. Each wheel unit has an antenna made of a flexible material in the form of an open annulus, suitable to be snapped into and held by its resilience against the inner periphery of the respective tire, a continuous wire loop being embedded in the annulus for transmitting signals but optionally also for receiving power. At symmetrical location about the inside of the antenna, an electro-magnentic power generator module, a gas-mass monitoring sensor module, and a signal transmitter are mounted, electrically interconnected, for giving a preferably two-bit signal indication to the common receiver. The latter may have signal decoding and alarm circuitry to display at least two different conditions, namely a warning and an alarm condition. The transmitter modules in the wheel units and the common receiver may have circuitry for intermittently but continuously transmitting the two-bit signal so long as the gas mass monitored by the respective sensor module is within predetermined limits, the absence of one of the two signals being indicative within the receiver of the warning condition, while the absence of both signals results in the alarm condition. The invention is also intended to relate to the wheel unit, to the antenna, separately, to the electro-magnetic power generator therein, and to the gas mass sensor mentioned above.

11 Claims, 34 Drawing Figures

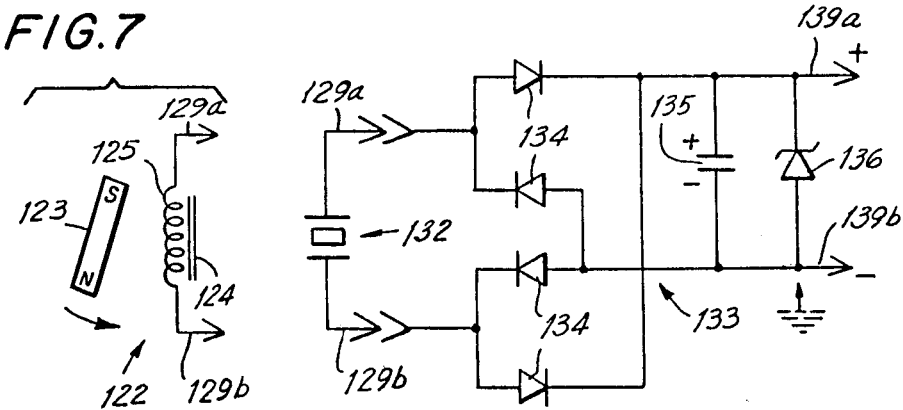
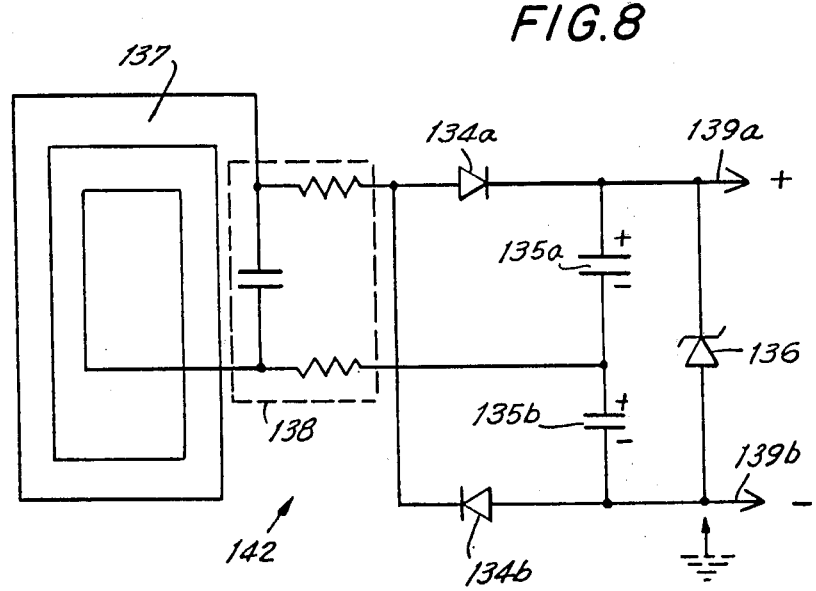
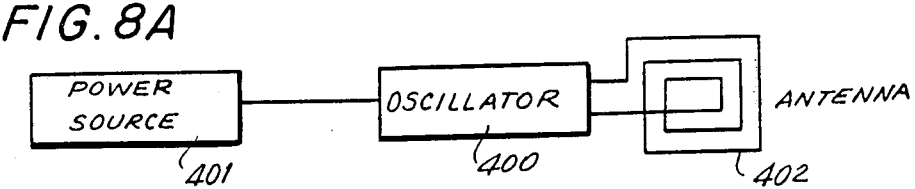

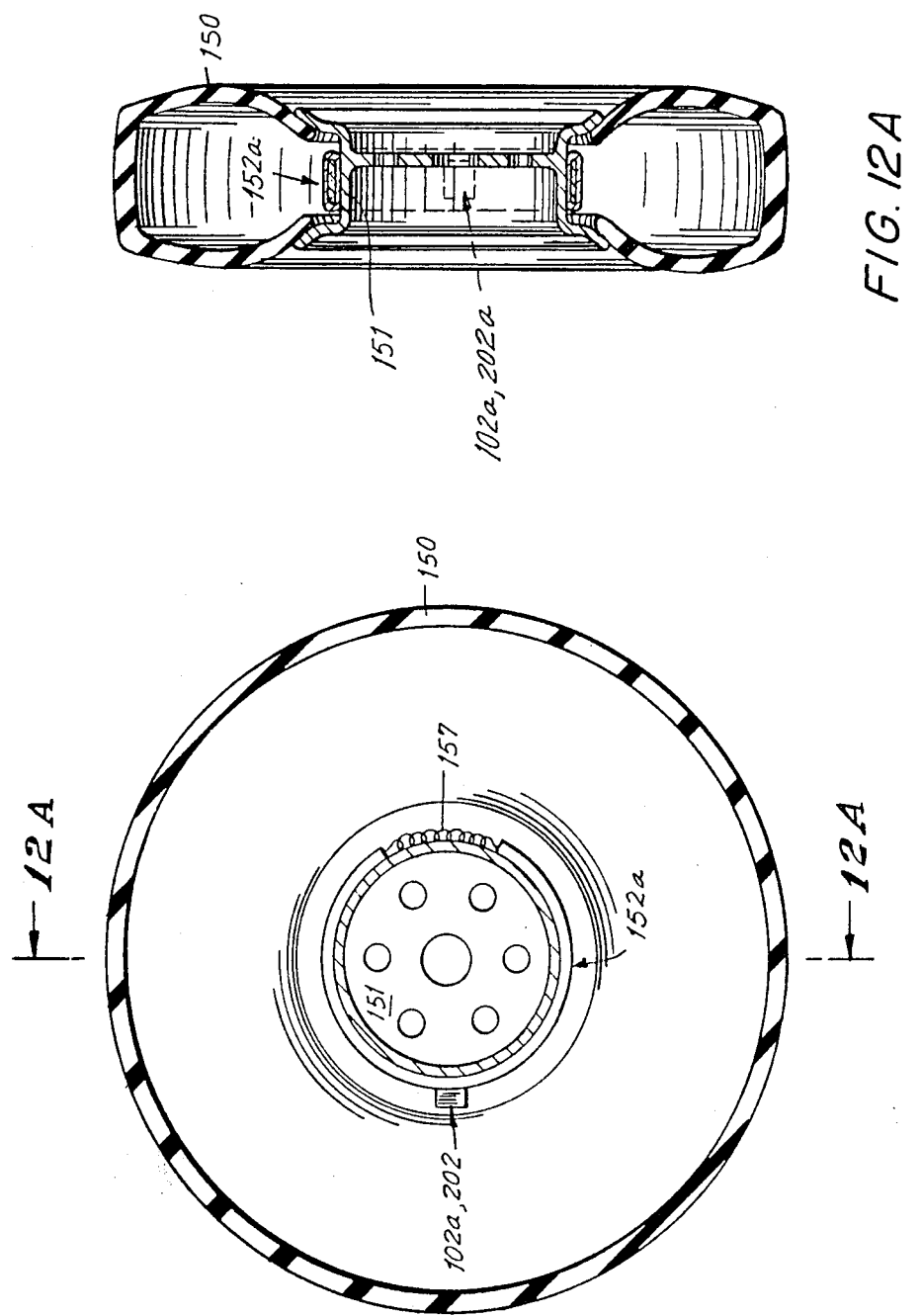

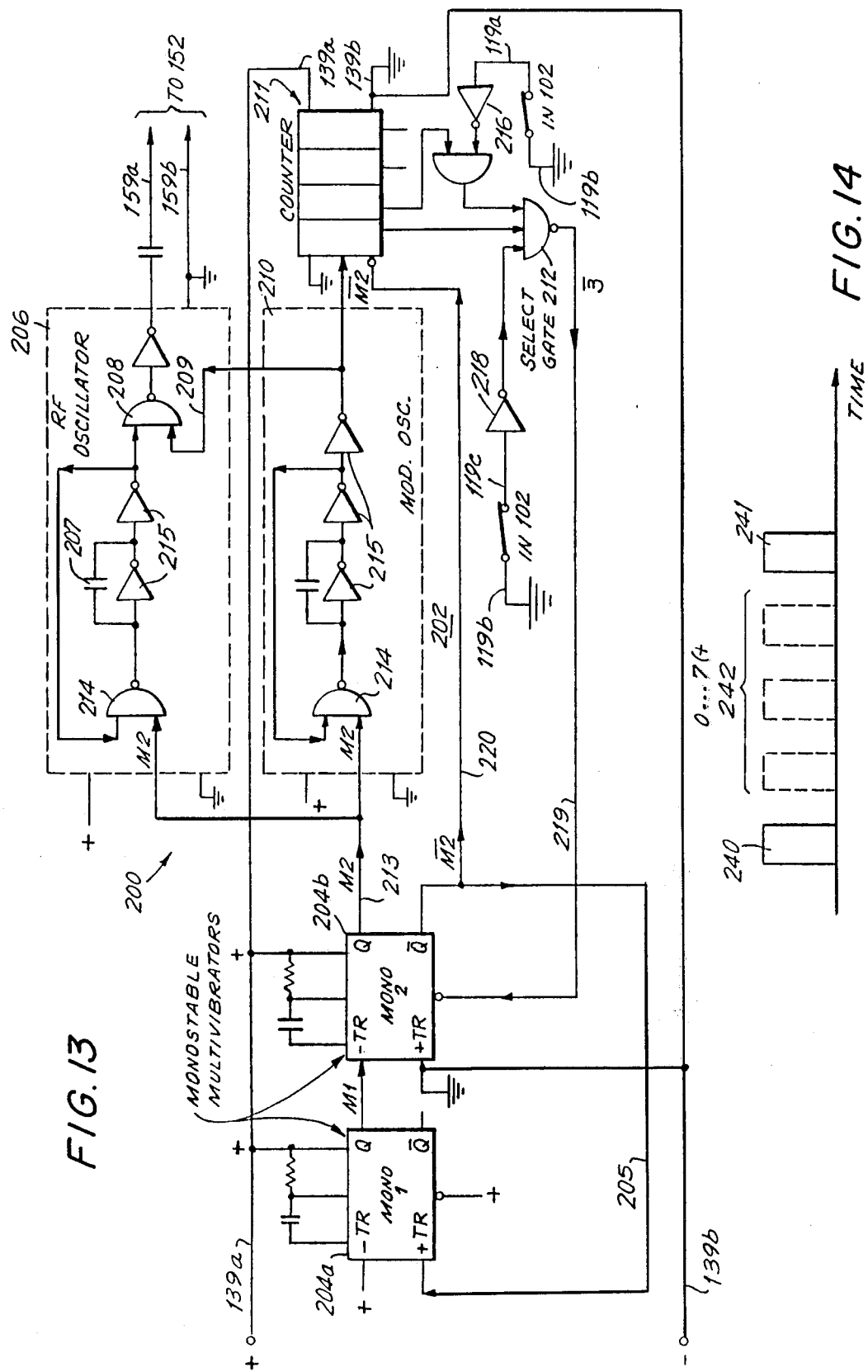

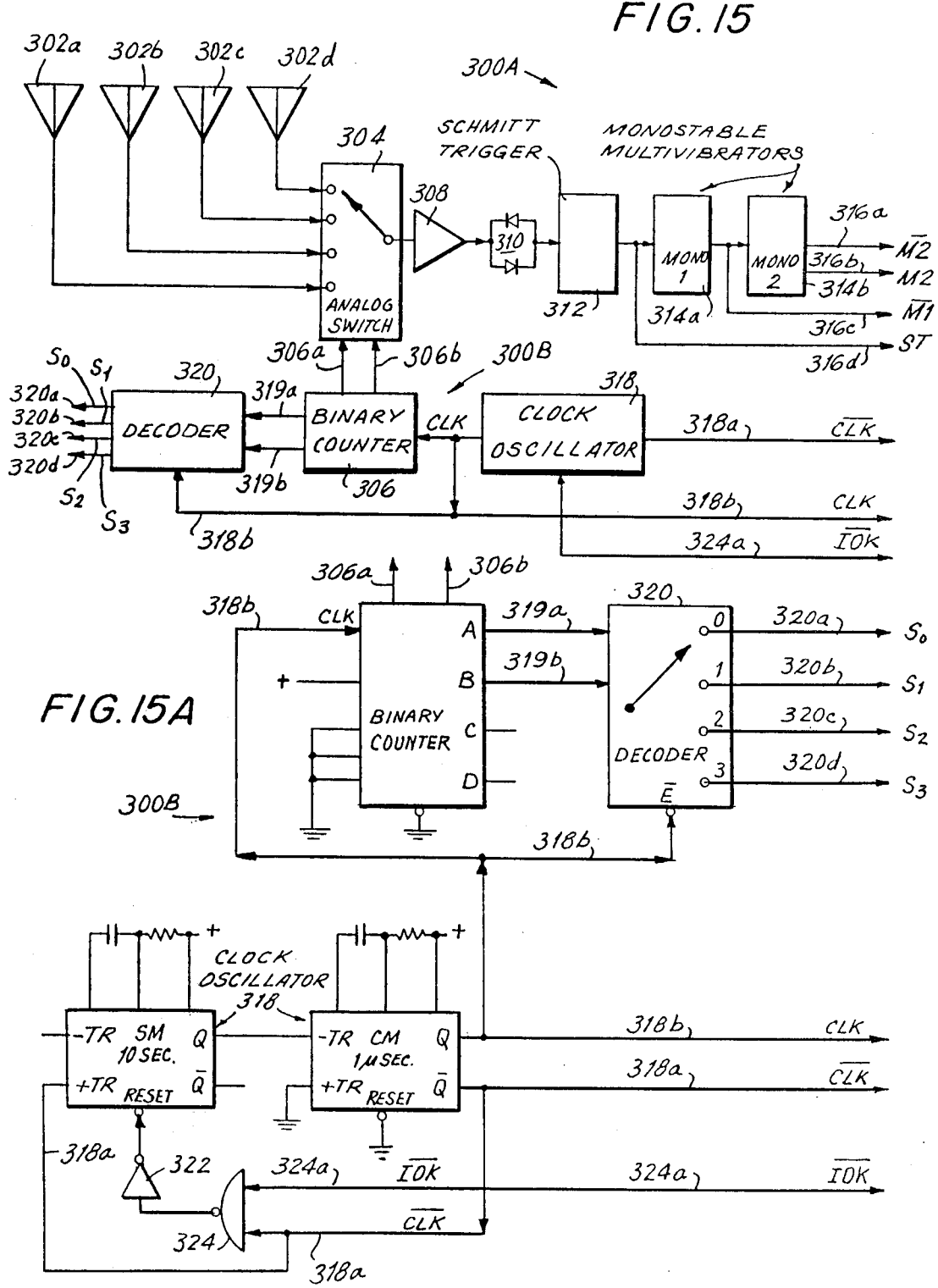

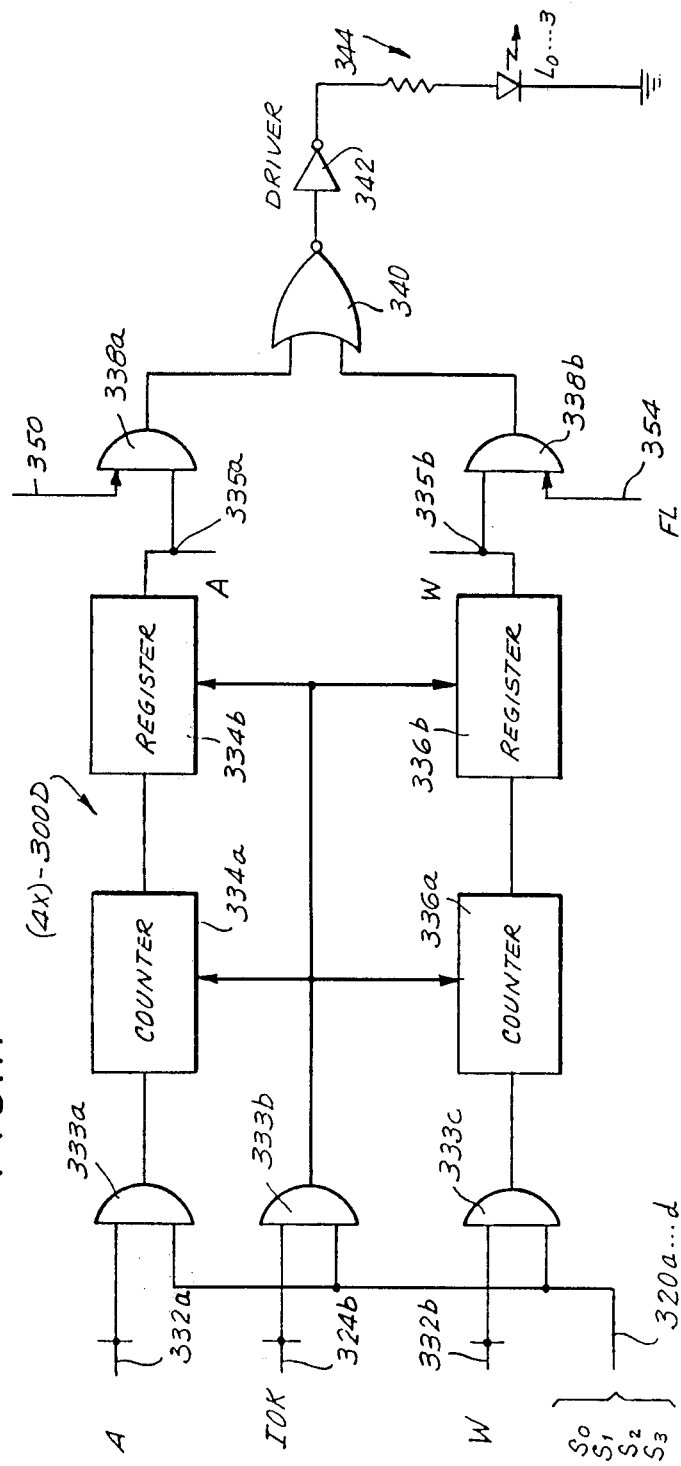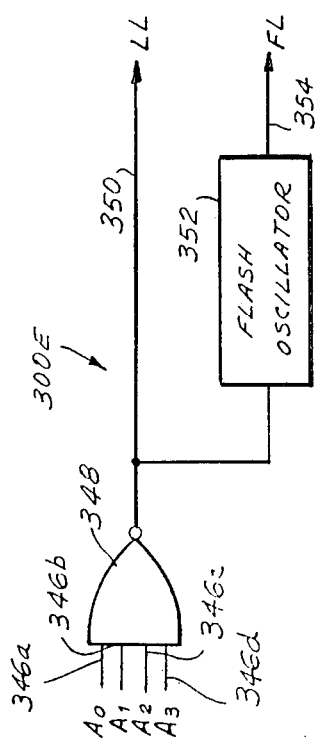
FIG.17
FIG.17A

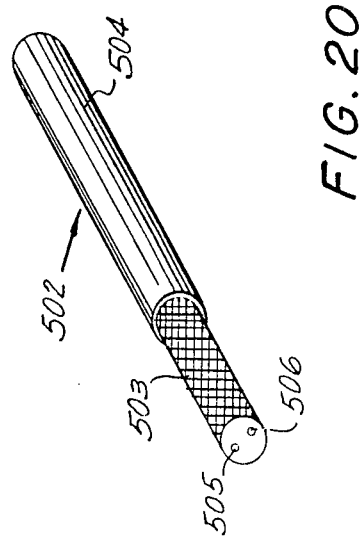
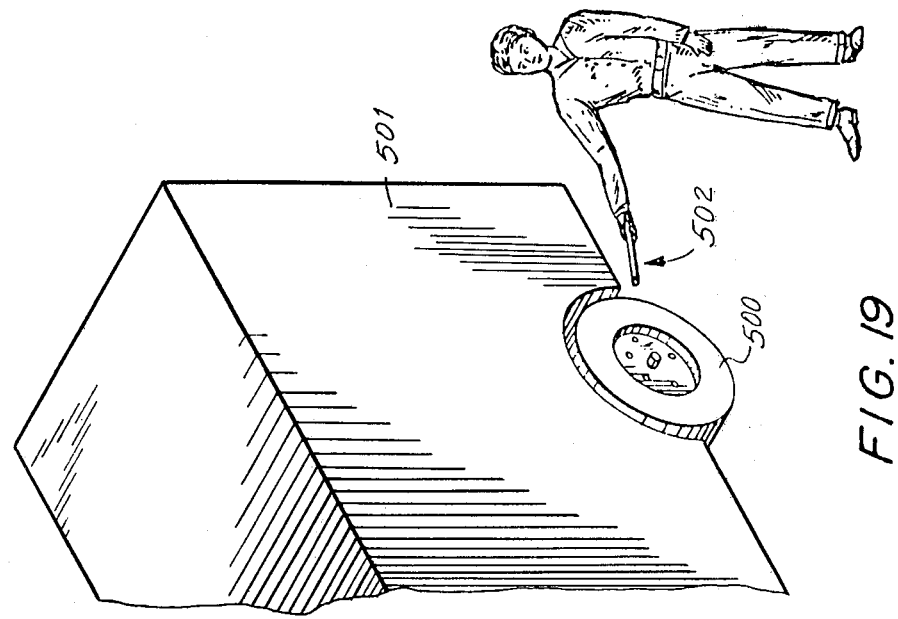

ALARM SYSTEM FOR MONITORING PRESSURIZED VEHICULAR TIRES

CROSS-REFERENCE TO RELATED APPLICATION

This application is a divisional of co-pending application Ser. No. 719,325, filed Aug. 31, 1976, now U.S. Pat. No. 4,126,772, dated Nov. 21, 1978.

BACKGROUND OF THE INVENTION

The invention relates to a low tire pressure alarm system for vehicles such as trucks and cars to prevent accidents due to tire rupture or dangerously reduced tire pressures.

The system monitors tire pressure, actually air mass, in each of basically four active tires of a vehicle on a continuing basis. Each wheel has a self-contained unit including an air-mass or pressure sensor cooperating with a power generator and a transmitter, all integrated into a single easily insertable and replaceable unit.

Information furnished by the wheel units is transmitted to a common receiver when the vehicle is moving, which displays an "O.K" indication when all signals are received as normal; or a warning condition, e.g., with a flashing light; and an alarm if there is a failure in any of the wheels.

In addition to the basic two-level alarm capability to detect incipient failure, the system is also capable of providing individual indication of the tires to identify which one of them might fail or has already lost pressure or gas mass.

The present system is completely fail-safe. Failure of any transmitter of the wheel units triggers the alarm system, except when the vehicle is at standstill, so that accidents can be prevented under all operating and weather conditions.

The entire wheel unit, including the sensor, power generator, and own antenna, is fastened to the inner periphery wall of the tire or alternatively to the outer rim of the steel wheel. It is important to note that there are no batteries in the wheel units, power being preferably obtained from the mechanical movement of a mechanism responsive to flexure of the tire as it flattens out on each revolution when going into contact with the road. Alternatively, this electro-magnetic power generator can be substituted by piezo-electric generating means, or by beamed power from the outside to each wheel from a single transmitter or from individual transmitters located near the wheels.

The invention also contemplates the use of a hand-held device, combining a transmitter and a receiver for ready indentification of the individual wheels or tires even on stationary vehicles, by walking up to the tire and getting a signal in response.

There is no wire between the centralized receiver and alarm unit, but antenna extensions may be brought to areas adjoining the wheels for increased safety of reception.

Tire inflation monitors have been known before, but they failed in one or more respects, so that the present invention is considered to constitute a major breakthrough and improvement over all hitherto known and used systems. There have been monitors that are locally applied to the wheels, there being no temperature evaluation devices for considering the temperature variations within the tire, thus reflecting inaccurate pressure differentials.

SUMMARY OF THE INVENTION

While the scope of desired patent protection will be defined later on in this application, the major inventive features are being set out here. First, it is important that air mass rather than pressure is used as an actuating agent in the sensors of the wheel units. No springs are used, and there is no inherent mechanical or other sluggishness. Since the air inside the device tends to have the same temperature as the air outside the device, the effect of temperature on pressure is substantially eliminated. This means that the inventive pressure or actuating mass sensor is completely compensated for cold days, hot days, hard running conditions, and the like outside influences.

Climatic conditions within tire cavities are rather strenuous, such as water, ice, graphite, talcum powder, other agents and primarily humidity. In the inventive sensor everything takes place within a sealed cartridge. The mechanism cannot freeze, the electrical contacts cannot corrode, because the sealed sensor cartridge may contain dry air, nitrogen, or some other inert gas. The only moving part exposed to the outside is a flexible diaphragm that cannot be prevented from its relatively small motion by poor climatic conditions.

It is important to note that centrifugal forces arising from tire rotation have absolutely no effect on the measuring forces, the structural and directional arrangement being such that the relatively small mass and movements are not affected by such outside forces.

The earlier-mentioned electro-magnetic power generator is unique in that it works on the principle of deriving energy from the simple fact that each tire becomes flattened once every revolution. Geometrically, this is the change in length of the chord of an arc to the arc flattened into a substantially straight line. A small closed magnetic circuit is alternately opened and closed by this movement, again unaffected by centrifugal forces as the tire rotates. Tests have proven that even the small resulting mechanical power is sufficient to break ice formation.

Magnetic attraction is used to re-close the circuit. The speed of altering the flux is achieved by introducing a sudden air gap in the power-generating device, needing very little motion.

As to the antenna used in each wheel, the invention provides the same within a resilient, foam-encased cover, preferably with a rubber skin, offering sufficient toughness to resist climactic conditions. This antenna structure may be held or guided within the wheel to restrain to same axially but not radially.

According to another important feature, the pressure sensor, the electro-magnetic generator, and the electronic part of the wheel transmitter are distributed to three areas, symmetrically about the periphery of the antenna, for proper weight distribution, and to lessen the load on each of these areas. The antenna has wrinkled or wavy wires, suggested to eliminate tensile breakage.

IN THE DRAWINGS

Other objects, inventive features, and advantages, will become readily understood by following the description that follows having reference to the accompanying drawings, wherein FIG. 1 is a somewhat schematic overall view of a truck embodying the inventive tire pressure alarm system, showing on one wheel a wheel unit with its transmitter included, a common receiver in the driver's cab, and optional receiving antennas adjoining to the wheels;

FIG. 5A is an end view of a sensor of FIG. 5 with the diaphragm and retaining ring removed;

FIG. 5B is a perspective view of the clamping ring of the sensor unit;

FIG. 5C is a sectional view of one contact shown in FIG. 5;

FIG. 5D is a sectional view of a second contact shown in FIG. 5;

FIG. 7 is an electrical, schematic illustration of the power generator of FIGS. 6 and 6A;

FIG. 7A is a complete rectifying circuit to provide the necessary DC output, shown here with an exemplary piezo-electronic generator;

FIG. 8 is yet another alternative, deriving power from outside by means of a loop, and including a voltage doubling rectifying circuit;

FIG. 8A is schematic illustration of transmitter for transmitting power to the wheel;

FIG. 12 shows an alternative arrangement of the antenna and the electronic circuit, attached to the wheel rim;

FIG. 12A is a view similar to that of FIG. 11A, taken along line 12A—12A of FIG. 12.

FIG. 13 is a schematic electronic circuit diagram of the transmitter used in each wheel unit, optionally usable as a test generator;

FIG. 14 illustrates the code pulse transmission within the system;

FIG. 15 is a block diagram of a first receiver section, including an optional analog switch and other electronic units;

FIG. 15A is a more detailed schematic of a binary counter, decoder and clock oscillator, also forming part of FIG. 15;

FIG. 17 is a block diagram of one of four wheel alarm and warning circuits;

FIG. 17A illustrates circuitry including a flash oscillator to provide steady and flashing signals for the alarm and the warning outputs respectively;

FIG. 19 is a partial view of a vehicle showing a handheld test unit for sensing tire pressure;

FIG. 20 is an enlarged view of the hand-held test unit;

DETAILED DESCRIPTION OF THE PREFERRED EMBODIMENT

Figure 1:
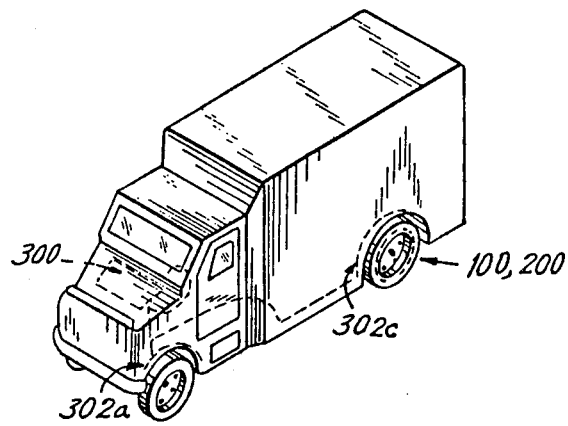

In FIG. 1 of the drawings, a schematic illustration of a truck is given with only the major components of the inventive low tire pressure alarm system, namely a wheel unit 100, and a transmitter 200, both being schematically shown on the rear left-hand wheel of the truck, a receiver 300 being schematically shown inside the driver's cab, connectable with its power unit to the usual DC battery source of such vehicles. This view also includes two receiver antennas 302a, 302c, which are in one exemplary embodiment, near the wheels, that could also be provided in a single antenna 302 to which reference will be had in FIGS. 1 and 15.

FIG. 1 is not considered to be complete and does not serve to show all important constituent parts of the inventive system, or optional ones, but merely to illustrate the locations of the most important elements.

Usually there will be four wheel units 100 in use on a vehicle, one attached to each of the active wheels. These transmit their coded information to the common receiver 300, which interprets the signals and determines whether the received information is sufficient to cause an indication of normal conditions, or alternatively, a "warning" or "alarm" condition.

It might be mentioned now that the method of transmission from the wheel units 100, 200 to the receiver 300 is radio frequency (RF), preferably just above the broadcast band, essentially in the range between 1700 and 2000 kHz.

Figure 2:
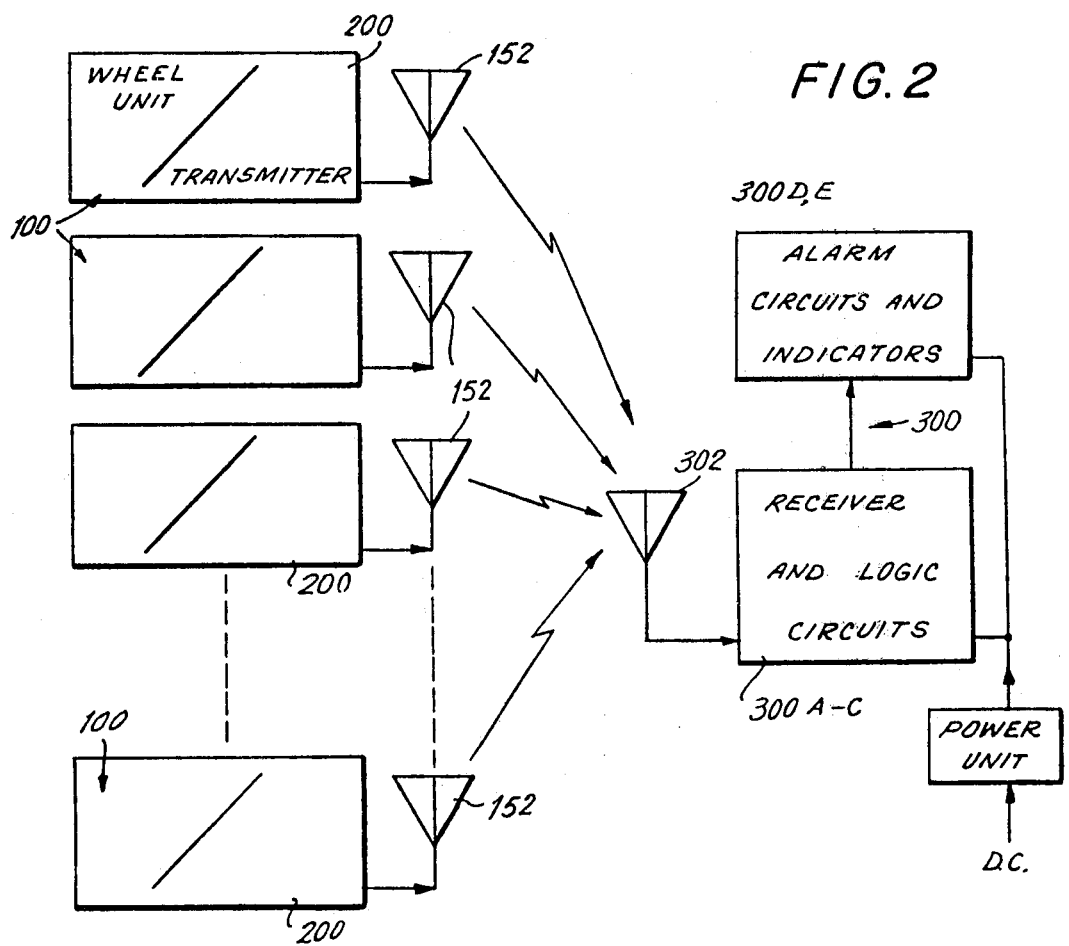
FIG. 2 is an overall system schematic that correlates several, up to seven, wheel and transmitter units with a common receiver, the latter also having alarm circuits and indicators associated therewith.

While FIG. 1 shows a truck with four wheels, schematic block diagram of FIG. 2 illustrates a system which is optional, for a possibly higher number of wheel units 100 and transmitters 200, possibly with a complement of seven, anticipated when two snow tires and a spare are included, or even a greater number of tires on multi-wheeled trucks. If four snow tires are used, they will most likely replace all four of the initial active units.

FIG. 2 also shows antennas 152 associated with each wheel unit and transmitter, as will be explained later in more detail. The earlier-mentioned receiving antenna is shown in FIG. 2 by way of a single antenna 302 although, as in FIGS. 1 and 15, each wheel may have separate antenna associated therewith (302a . . . 302d).

In its circuit diagram, the receiver includes various logic and other circuits, identified by the box 300A . . . 300C. with which is associated another box including alarm circuits and indicators, designated 300D, 300E. In the stationary receiver unit power can be derived from the electrical system of the truck (identified by "D.C."), if necessary through a suitable (schematically indicated) power unit.

Between the transmitters 200 and the sole receiver 300, pulse-modulation is being used, and the receiver looks for any four of the seven valid codes, if the system is equipped to recognize signals from individual wheels. More codes could be provided, and one could set the number searched for any value. The basic, two-code, pulse transmission will be described later with reference to FIG. 14.

Figure 3:
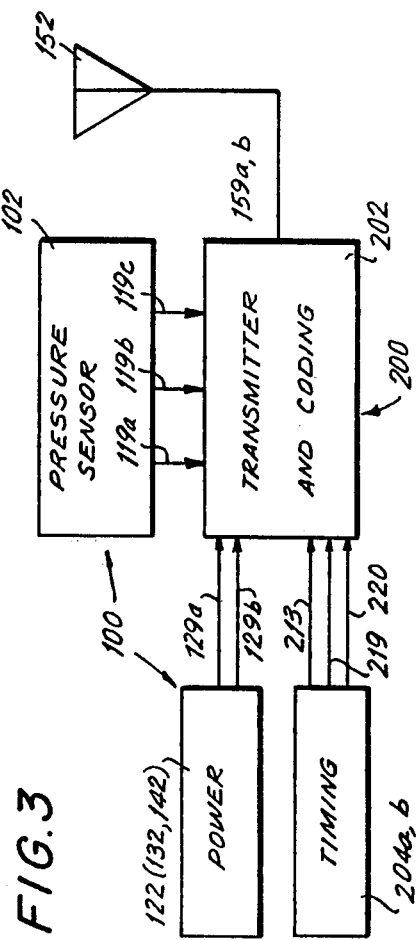
FIG. 3 is a similar schematic block diagram including a pressure sensor and a power generator of the wheel unit, associated with a timing and coding unit of the transmitter, and the individual wheel antennae.

In FIG. 3, the wheel unit 100 and the transmitter 200 are shown schematically with their correlations, including a pressure or air mass sensor 102 which feeds warning or alarm signals to the transmitter through wires 119a, 119b, and 119c, and electromagnetic power generator 122 which feeds the required DC voltage to the transmitter through wires 129a, 129b. The particular transmitting unit shown herein is identified by numeral 202 of which the particulars will be described with reference to FIG. 13. There is also a timing unit 214a, 214b, which is linked to the unit 202 by way of wires 213, 219, and 220. Each transmitter 200 has its own antenna 152, linked by way of wires 159a, 159b, (shown here as a single connection).

Figure 4:
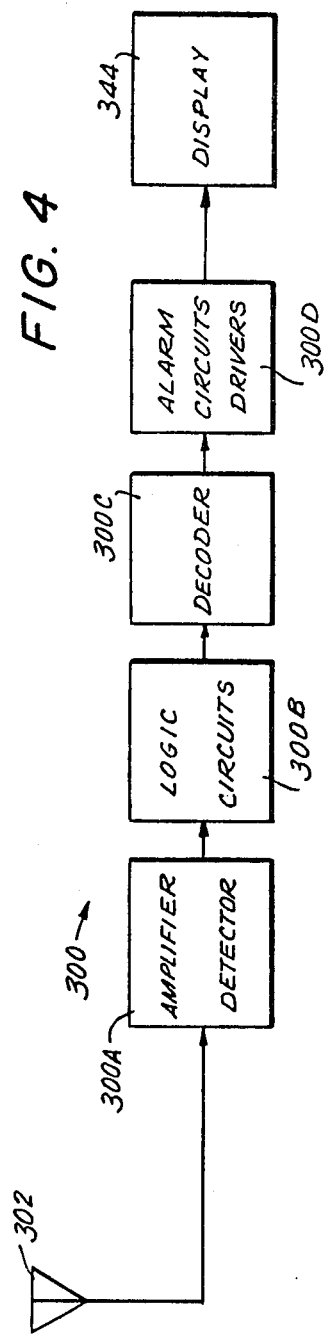
FIG. 4 is a schematic block diagram of the receiver, showing the major component units in a somewhat arbitrary grouping, from an amplifier through to the final display.

Coming now to the schematic of FIG. 4, the input antenna 302 can be used for all wheels but it is also possible as mentioned before, to have separate receiving antennas, preferably adjacent to the wheels. The section 300A is identified as an amplifier and detector section, which is like the front end of a broadcast-band receiver. It is kept on whenever the ignition of the vehicle is on, and waits for signals from the wheel units 100 and transmitters 200. If all four signals are missing, it is assumed that the vehicle is stationary, and the output indicators are all suppressed.

The subsequent sections 300B with logic circuits, and 300C with a decoder, decode the PCM (pulse code modulated) signal, and holds the resultant outputs for a preset time, such as a maximum of two minutes. If at the end of this time, some are missing, the alarm will be set, as will be explained later.

A 4-out-of-7 decoder circuit and a low-alarm section determine if all four signals are present and also note the presence of the "low-alarm" or "warning" channel bit. These outputs are in "logic" form and must be amplified in a subsequent Alarm and Driver Section 300D to work a display Section 344. The circuitry and particulars of all these Sections will be described later in more detail, with reference to FIGS. 15 through 18.

Presence of all four signals will cause the "O.K." light to be lit, with maybe a green LED (light-emitting diode) indicator. Presence of the "low-alarm" or "warning" signal will cause the "O.K." light to blink. Absence of one or more of the four signals expected will cause a red alarm LED and an optional audible alarm to be activated.

Absence of more than two of the "normal" signals is taken to mean that the vehicle is stationary and all output indicators are then suppressed. It should be understood that more than two simultaneous flats are unlikely without furnishing other driver clues.

Failure of any of the wheel units results in no signal or only an insufficient signal being transmitted, and the failure is then being sensed. This provides the earlier-mentioned fail-safe operation that is required for such installations.

Figure 5:
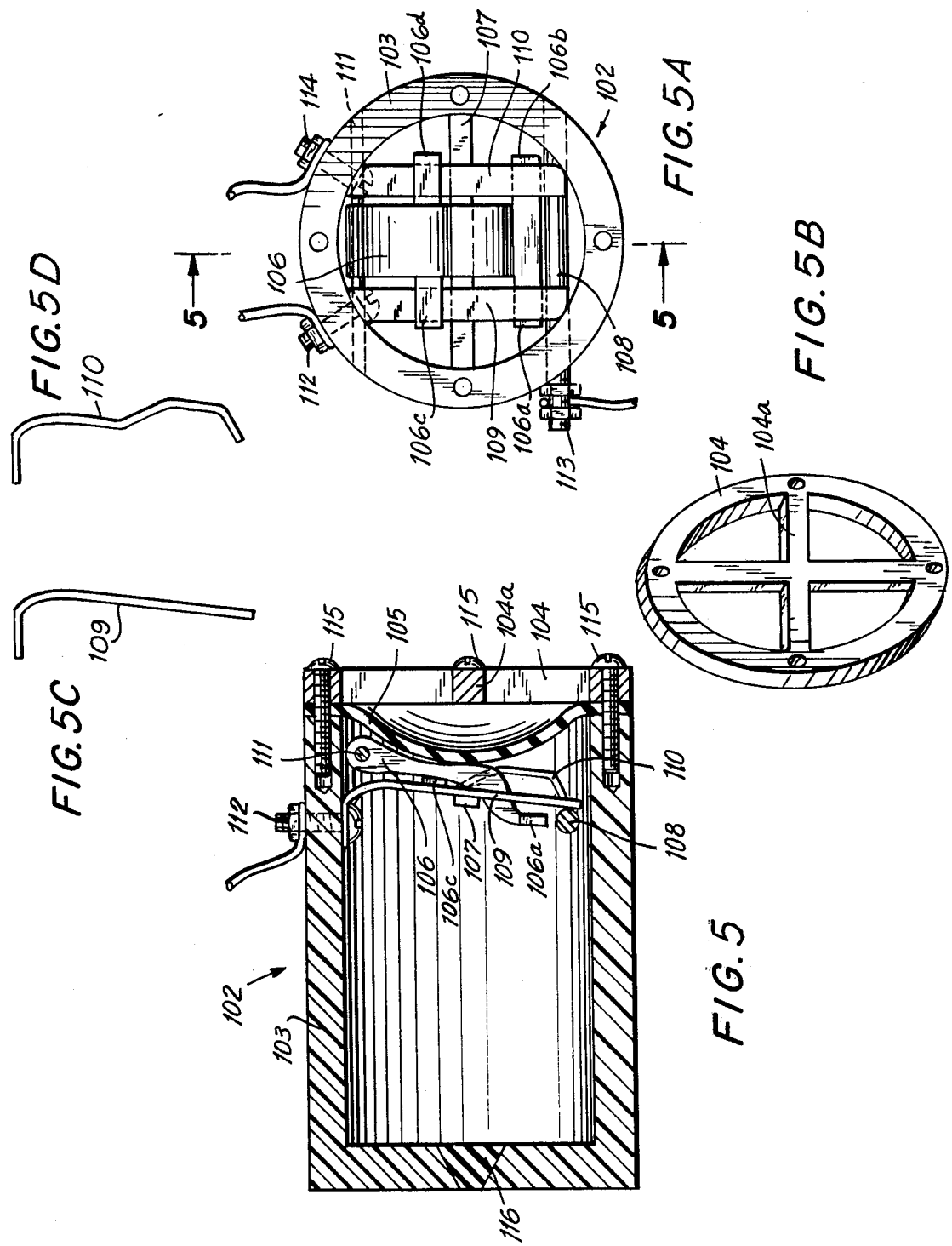
FIG. 5 is a longitudinal section through the sensor according to the invention, taken along line 5—5 of FIG. 5A.

FIGS. 5, 5A and 5B illustrate a pressure or air-mass sensor unit that is installed within each wheel, preferably attached to the antenna 152, as will be explained with reference to FIG. 10. The sensor is generally designated 102 where compressed gas is introduced into plastic housing 103 through a filler hole or the like, located in the bottom wall of housing 103. The hole is closed by a suitable plug 116. When the air pressure within the cavity reaches a predetermined value, the hole 116 is permanently sealed such as with epoxy cement or the like. The opposite end of the housing 103 is sealed off by an impermeable, preferably silicone-rubber diaphragm 105 which is clamped by a ring 104 with appropriate screws 115 to form an air-tight seal with the housing 103. The ring is formed with a retaining cross 104A to retain the diaphragm 105 against excessive outward flexure under force of the compressed gas in the housing 103 while leaving the diaphragm free to be acted upon by internal tire pressure, as will become clear as this description proceeds.

The diaphragm 105 can flex back and forth depending on the relative pressures exerted on either side of it, namely by the compressed gas within the housing 103 or by the air within tire cavity surrounding the sensor 102. If the pressure on the inside of the sensor is higher than that outside, the diaphragm 105 will tend to bulge outwards and vice versa.

An actuating lever 106 of non-electric material is bonded to the diaphragm 105, preferably in its center along the area of contact shown in FIG. 5, so that it is constrained to move exactly as the center of the diaphragm moves. The lever 106 is pivotably supported by a pin 111 or the like, extended between the side walls of the housing 103 so as to be leak-proof. The lever 106 has two lateral extensions 106a and 106b, at its free end, which are used to engage corresponding areas of electrical contacts 109 and 110 respectively. These two contacts are fastened to the housing 103 by means of connecting screws 112 and 114, and the former being visible in FIG. 5. These screws, although air-tight, provide electrical connection to and from the contacts 109, 110 in conjunction with a common ground wire to be described hereunder.

Both contacts 109 and 110 are flexible and normally in electrical contact with a contact bar 108 extended between the sides of the housing with one end extended outside the housing and terminating in a contact post 113 (see FIG. 5A). In normal operation, both circuits are completed or closed. When the diaphragm is pushed inward, to the left as shown in FIG. 5, because the air within the tire is sufficiently pressurized, contact will be made between contact bar 108 on the one hand, and both of the contacts 109, 110, on the other, to indicate a predetermined pressure condition.

When the internal tire pressure drops, the diaphragm 105 moves outward, pulling lever 106 with it. When the lateral extension 106a engages the contact 109 it moves the contact out of touch with contact bar 108, thus breaking the first circuit, to give a "warning" signal.

If the tire pressure continues to fall, the extent of the movement of the lever increases, and now the extension 106b hits the contact 110, which is sufficiently bent to be engaged at a later point in the movement of the lever 106 than the extension engages the contact 109. When the extension 106b engages the contact 110, it is lifted off the contact bar 108 breaking the second circuit to sound a "danger" signal. It will thus be understood that a two-level contact arrangement is provided, the movement of the diaphragm outward under decreasing tire pressure as viewed in FIG. 5, interrupting first the circuit of contact 109, and then the circuit of contact 110, in both instances with respect to the contact bar 108, which will first give the "warning" signal to indicate something is going wrong with tire pressure, and finally a "danger" signal as a final admonition that tire pressure must be corrected to avoid an accident. When more air is put into the tire, the diaphragm 105 and lever 106 return to normal, and contacts 109 and 110 move back into engagement with the contact bar 108.

The sensor 102 also has a means to indicate when the tire is over-inflated to sound a "danger" signal. Extended between the side walls of the housing 103 is a stop 107 of non-electric material. Under normal tire pressure, the contacts 109 and 110 rest on the stop 107 and on the contact bar 108 as shown in FIG. 5. The lever 106 is provided with a second set of lateral extensions 106c and 106d. These extensions 106c and 106d, under normal inflation of the tire, merely engage the contacts 109 and 110 on the face opposite the face that will be engaged by the contacts 106a and 106b upon outward movement of the diaphragm 105 and lever 106 and substantially midway between the stop 107 and the pivot pin 11.

When over-inflation of the tire occurs with the parts in the normal position shown in FIG. 5, the diaphragm 105 and the lever 106 move inward. Immediately, the lateral extensions 106c and 106d push on the contacts 109 and 110 and flex them in unison about the adjacent corner of the stop 107. This flexing causes the free ends of the contacts 109 and 110 to move out of contact with the contact bar 108 breaking the two circuits, and causing the "warning" alarm to be initiated. When the internal pressure of the tire is reduced to normal, the diaphragm 105 and lever 106 move outward permitting the contacts 109 and 110 to flex back to their normal positions in engagement with the contact bar 108.

The stop 107 also serves to prevent excessive movement of the contacts 109 and 110, the lever 106 and the diaphragm 105 under excessive tire pressure.

It will be seen that the electrical terminal 112 has a wire 119a attached to it, the terminals 113 and 114 also having respective wires 119b and 119c. The connection of these wires will be seen in FIG. 10 (antenna) as well as in FIG. 13 (transmitter).

Figure 6:
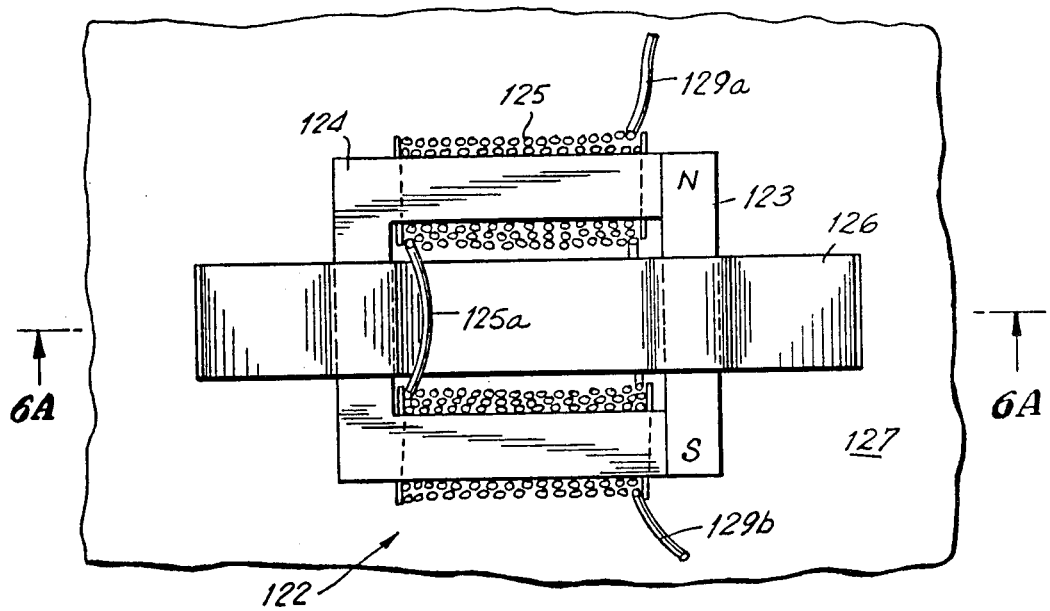
FIG. 6 is a top elevational view of the electromagnetic power generator used in association with the sensor.
Figure 6A:
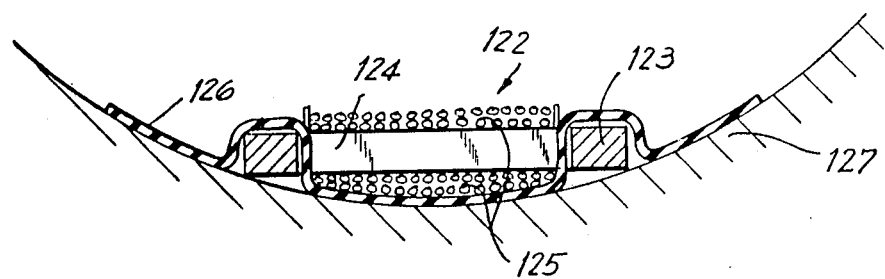
FIG. 6A is a sectional view taken along line 6A—6A of FIG. 6.

The exemplary, preferred electromagnetic power generator 122 shown in FIG. 3 is illustrated in its structural aspects in FIGS. 6 and 6A. The generator is based on the principle of breaking a complete magnetic circuit by introducing an air gap which induces a small electric current to flow in a multi-winding copper coil that surrounds the magnetic core.

The generator essentially consists of a U-shaped soft, permeable iron bar 124 on which are wound two multi-turn coils 125, linked by a wire 125a while the outputs are shown at wires 129a, 129b. The magnetic circuit is completed by a loose striker plate 123, identified with its N and S (north and south) poles, as usual, which can be a simple, straight, permanent bar magnet.

This bar is normally attracted to the U-shaped bar 124, and so the circuit is closed. Forcible separation of the plate 123 from the U-shaped bar 124 introduces an air gap into the system, and the magnetic flux in the circuit falls abruptly. This change is responsible for generating an EMF (electromotive force) in the coils 125.

The mechanical force needed to separate the bars 123, 124 is furnished by a restraining strap 126 that is preferably made from a resilient, stretchable material, such as rubber or a suitable plastic. As shown in FIG. 6, this strap holds the bar 123 down to a part 127 which may form a support for the generator and also holds the bar 123 in a similar fashion.

The part 127 is preferably in the form of a plastic ring that can be placed inside the tire, and which moves with the outer tread of the latter, effectively following its every movement especially due to the fact that centrifugal pressure works on it as the tire rotates. This can be better understood by referring to FIG. 11 where the generator 122 is shown at the very bottom of a tire 150, the flattening as a result of load being applied to the wheel being, however, omitted from the illustration.

As the section of the strap 126 assumes the lowest position when the outer tread of the tire is in contact with the ground, the arc shown will effectively straighten out, and as it does so, it will pull the two bars 123, 124 apart. Once the area and the components assume the natural curvature upon further rotation of the wheel, the magnetic attraction of the bars will close the magnetic circuit once more.

It should be noted that a plastic bag and the like (not shown) could be added for dust protection within the tire. The role of this generator in electrical respects will be described later when referring to the transmitter shown in FIG. 13.

FIG. 7 shows the electrical equivalent circuit of the generator 122 with the bars 123, 124, the coil 125 and the wire outlets 129a, 129b. Referring again to the schematic illustration of FIG. 3 alternative power sources are shown in FIGS. 7A and 8, numbered 132 and 142. The former is a piezo-electric generator that can be connected to the same output wires 129a, 129b, while the other alternative current source will be described hereafter.

Both units 122, 132 can feed their outputs into a conventional bridge-type rectifier circuit having diodes 134, constituting together rectifier unit 133, bridged by a conventional large capacitor 135 and preferably a voltage-limiting zener diode 136, set for example for a cut-off voltage of 12 volts. The final output of any one of these power supplies is at wires 139a and 139b, the former being the positive pole, and the latter being at ground potential, as will be seen when referring to the circuit of FIG. 13.

It will be noted that the flow of current, in either circuit arrangement, is rectified and stored in the capacitor for use at a later time when needed. A more direct way of obtaining energy would be by means of a "feeler" or mechanical link, either between two areas of the tread, or from the wheel rim to the tread (not shown).

FIG. 8 shows an alternative power supply system, employing transmission from the stationary part of the vehicle to the wheel unit. This is done at a convenient frequency, for which the range of one of two MHz has been found to be satisfactory. This permits the antenna of the wheel transmitter or possibly a separate antenna to be used as a power receiver during the interval in which power is being accumulated, and between transmission times. The transmission of power to the wheel would be at a level high enough that a tuned antenna loop could produce several volts peak-to-peak (although at the high impedence), which can then be used as the input to a voltage doubler, and thence to the already described capacitor. The transmitter for transmitting power to the wheel consists of an oscillator 400, a power source 401, and a transmitting antenna 402 as shown in FIG. 8A. The power source 401 is a self-contained unit or can be taken from the vehicle battery.

In the wheel-identification option of the invention, which employs a transmitting loop in the neighborhood of the wheels, the coupling is closer, and thus a smaller step-up can be tolerated for the power receiver period.

This alternative of FIG. 8 shows a tuned antenna loop 137, a circuit 138 providing for proper impedance matching and possibly for tuning, followed by diodes connected in a doubler circuit, shown as 134a, 134b. They are followed by separate capacitors 135a, 135b, and the Zener diode 136 as was explained for FIG. 7A. The output appears again at the wires 139a, 139b.

In several of these alternative power supplies, the continuously available power is quite small, and thus care is being taken in the inventive arrangement, that leakage is minimized.

It should be understood by those skilled in the art that the respective capacitors 135 and 135a, 135b, could easily be substituted or supplemented by appropriate chargeable batteries of a small size, capable of storing the pulses received from the electromagnetic generator 122, the piezo-electric source 132 or the outside power feed-in 142.

Figure 9:
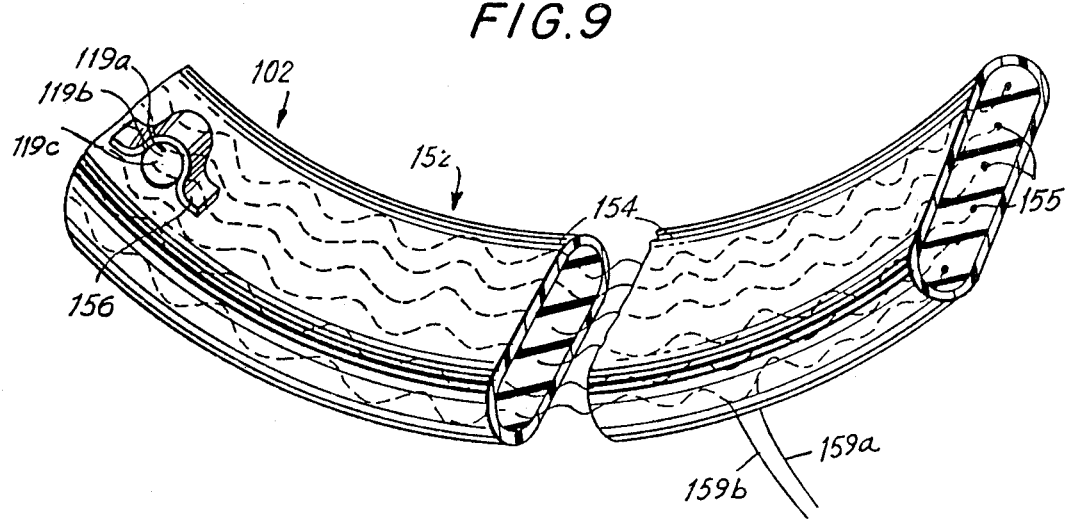
FIG. 9 is a partial sectional view of the inventive annular antenna to be placed within each tire, and also showing a module attached to it.
Figure 10:
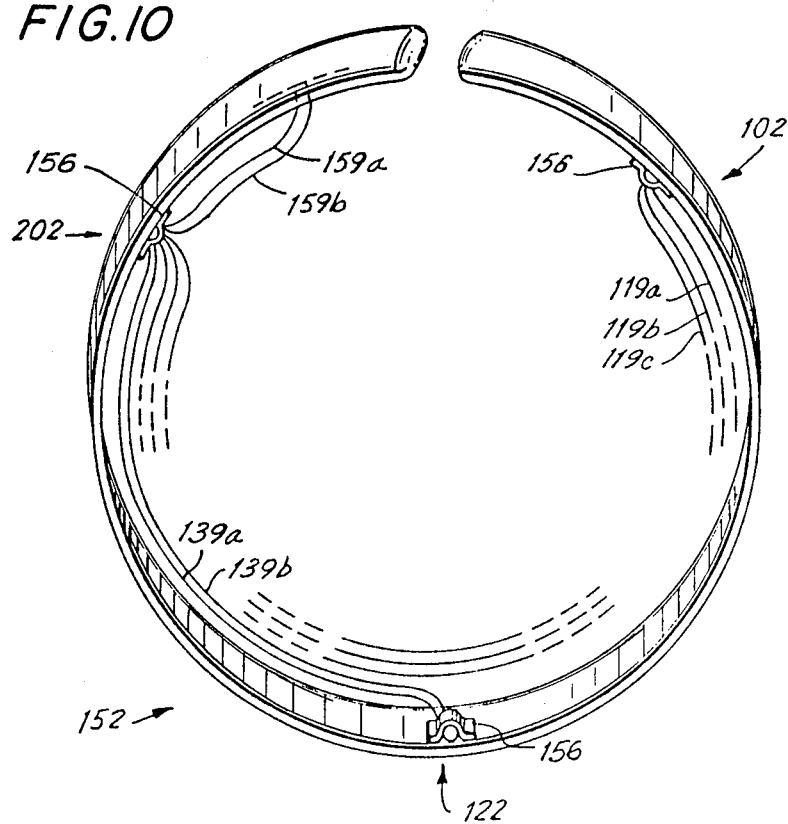
FIG. 10 is a perspective view of the entire antenna, having the pressure sensor, the power generator as well as an integrated electronic circuit attached thereto at three symmetrical locations and electrically connected therewith.
Figure 11A:
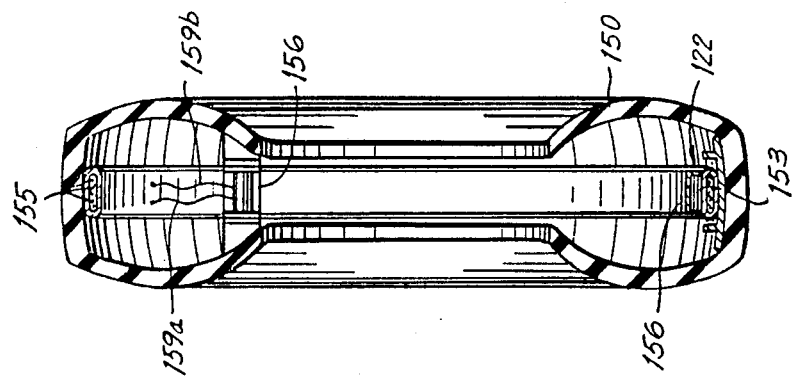
FIG. 11A is a section of the wheel taken along the line 11A—11A of FIG. 11.
Figure 11:
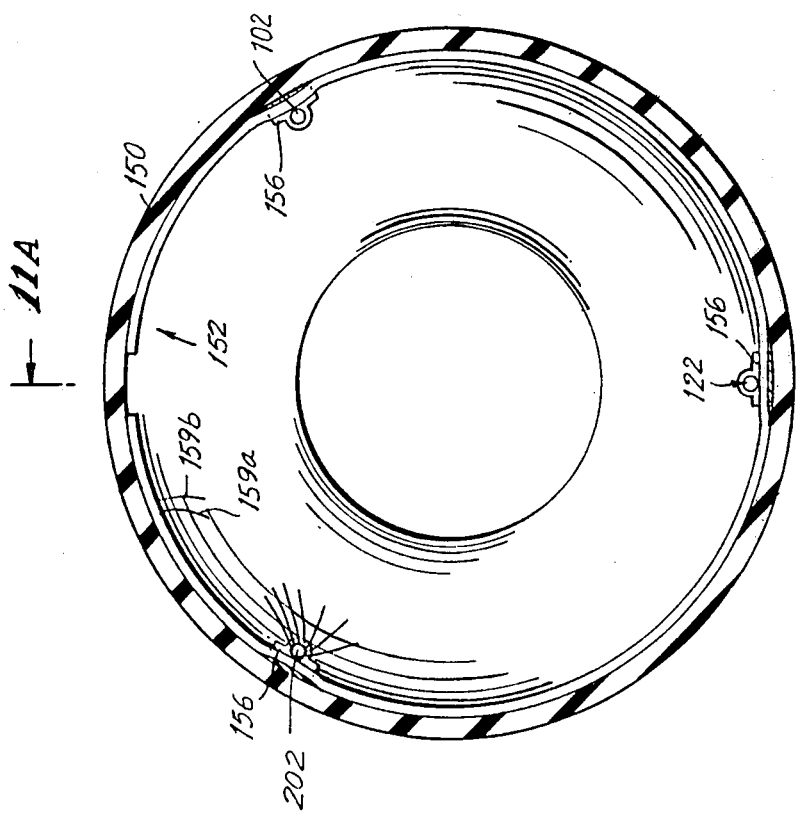
FIG. 11 is a sectional view through the wheel having the antenna of FIG. 10 inserted therein.

The antenna 152 is shown in FIG. 9 with its general construction, and in FIG. 10 in a perspective overall view. FIGS. 11 and 11A are respective sectional views that show the same antenna together with the associated equipment within the wheel 150. The purpose of the antenna is of course to radiate electromagnetic energy from the transmitter 200 or its integrated circuits 202 to the antenna 302 of the receiver, or alternatively, to the individual antennas 302a . . . 302d, that can be arranged in the vicinity of each wheel, for a close coupling with the respective transmitting antenna. The pulses will be transmitted and radiated by the antenna only so long as the pressure in the tire is high enough, and will cease once the pressure is too low. As mentioned earlier, the system operates in and the antenna is preferably tuned, for the top of the broadcast band in the area of 1600 kHz.

Physically, the antenna 152 consists of a number of copper or similar wire coils, sufficiently flexible to withstand bending and tension, encased in a silicone-rubber foam, which is then encased in a solid piece of rubber and the like. The wires are shown at 155, being wavy or curved within the foam to allow the resilient antenna to stretch and bend without damaging the wires. The outer sheath is shown at 154, and output wires for the continuous loop-type antenna at 159a and 159b. The latter can also be seen in FIGS. 10, 11, and 11A.

As shown in FIG. 10, the antenna 152 is preferably molded as an almost complete circle that can be fitted within the tire wall, the cross-section of the tire with the antenna in it being shown in FIGS. 11 and 11A; the gap between the open ends allows for accommodation within somewhat smaller or larger tires. The antenna will stay in place when the vehicle is in movement due to the centrifugal action. However, to aid in placing the antenna into a proper position, and to prevent side-to-side shifting when the vehicle stands still, two or three preferably molded side guides 153 are first placed into the tire (see FIG. 11A), preferably attached by pressure-sensitive backing material.

The antenna is snapped into position but remains free to move peripherally without any constraint, so as to adapt itself to the centrifugal forces acting on it.

As shown in FIG. 9 through 11, clamps 156 can be provided on the inner surface of the antenna at symmetrically disposed locations, namely for attaching thereto three appendages, namely the sensor 102, the power generator 122, and the transmitter unit 202. FIG. 10 shows how the respective wires 119a . . . 119c; 139a, 139b; and 159a, 159b, (the latter of the antenna itself) are dressed about the inner periphery so as to reach the transmitter unit.

It will be realized from FIG. 10 that each "wheel unit" actually consists of the sensor package 102, the power generator module 122, the electronic transmitter module 202, all mounted and interconnected with the antenna 152 as was explained before. The tire arrangement is packaged as a single assembly so as to provide maximum of convenience and ease of installation, and to minimize the possibility of damage to the interconnections. All wiring and interconnections can be made prior to the final encapsulation, and a complete unit is therefore able to be made rugged and relatively unaffected by the high "g" forces that are encountered within the vehicle wheels.

While three appendages are shown on the drawing, the units could be combined in any desired fashion and distributed about the inner surface of the antenna in any desired fashion to maintain the balance of the tire, having regard for the gap between the ends of the antenna when placed within the tire. Location of the appendages is critical so as to maintain balance of the tire and thereby prevent excessive wear of tire tread.

Although wires have been shown in FIGS. 10 and 11, they may not be physically viewable but fully enclosed and molded in or on the antenna itself, so that the observer or user would see simply an annular, flexible unit with three appendages at symmetrical locations, that has to be placed within each tire.

A major feature of the invention is the location of all these components within the tire air cavity, so as to obtain direct measurement or exposure to the tire pressure, or rather air mass therein, as well as to provide protection against dirt and moisture of the outside environment. Separate protecting measures can of course be taken, including individual or combined encapsulation of the described units 102, 122, 156 and 202. It will be understood that supplemental weights can be added where necessary so as to balance the three packages or modules on the molded ring-shaped antenna.

The antenna must be reasonably omni-directional so that wheel rotation and steering do not introduce propagation complications. In order to minimize directional effects, the invention contemplates the use of the system at frequencies where the size of the wheel and that of the antenna are comparable, and are much less than a wave length. This has been in the earlier-mentioned range of 1 to 2 MHz.

In the described antenna arrangement, each wire is wound as a single continuous loop, eventually folded about the wheel rim. The use of a built-in ground plane tends to minimize the losses which otherwise would occur when the ferrous wheel itself is left as the antenna ground plane. In this case, antenna efficiency is approximately proportional to the spacing between the loop of the antenna 152 and the ground plane.

FIGS. 12, 12A show an alternative way to clamp a somewhat smaller, alternative antenna 152a to a rim 151 of the wheel 150, e.g., by making use of a spring 157 and the like member. In this arrangement, a combined electronic module can be provided, preferably at a location just opposite the spring 157, where a sensor 102a and a transmitter 202a can be combined, possibly also with some sort of a power generator, in which case the arrangement 142 of FIG. 8 might be most appropriate since no relative movement flexure or other power-generating action can be obtained at this point without difficulties.

When the antenna 152a is mounted to the tire directly, the ground plane may also be provided, since the various types of steel-belted radial tires have different arrangements of metal and this cannot be relied on for the transmitter antenna. Again, antenna efficiency will depend on the physical size and spacing of the components. However, it is important that the antenna not be made so large that its self-resonent frequency is as low as the operating frequency.

It has been mentioned earlier that the transmitter antenna 152, 152a can be used for the reception of power, in addition to the transmission of coded signals, in which event isolation between the transmission and reception modes must be maintained, although both do not take place simultaneously. The circuit unit 138 shown in FIG. 8, possibly supplemented with the necessary components, can serve such a purpose.

FIG. 13 illustrates a preferred, exemplary circuit arrangement 202 of the transmitter 200 to be described hereinafter, in full detail. As one of the most important features it should be noted that the transmitter does not require any built-in or extraneous battery but is powered by the electro-magnetic generator shown in FIGS. 6 and 6A, preferably through a rectifier and power circuit as described in connection with FIG. 7A. Accordingly, the power feed-in of the transmitter 200 is at the points or on lines 139a and 139b, running from the left-hand side of the circuit diagram to the right-hand side, for feeding all important circuit elements, as will be described. It should be noted that line 139b is at ground potential, which was shown schematically in FIG. 7A although the power input as such does not necessarily have to be grounded.

The primary purpose to be accomplished in the transmitter 200 is to overcome noise that will be received at the common receiver 300 by use of high-energy RF bursts. These are transmitted at rather rare intervals in proportion to their duration, this combination producing a low duty cycle which conserves power. In this way, the transmitter can be certain of being "heard" in the failsafe system. As this was mentioned before, the signals or bits thereof are intermittently but continuously supplied from each wheel unit 100 to the receiver 300 and the absence of one or both bits in the signal can be used to give "warning" or "alarm" condition indications.

The transmissions are coded both for ready identification at the receiver, and to carry additional information. Before going further into the circuitry to FIG. 13, the coding systems employed by the invention will be described, referred to here as the "double-pulse" and "coded" pulse methods.

Referring to FIG. 14, two pulses or bits 240, 241 are transmitted by the unit 202 through its antenna 152 (right-hand top corner of FIG. 13) to indicate that all is normal at the particular wheel. The spacing between the two pulses is fixed and known, enabling the receiver 300 to discriminate between a wheel unit and noise. For a "low-level alert" or "warning", which indicates reduced, but not dangerous air mass or inflation, the second pulse 241 is dropped. The time relationships in FIG. 14 are not necessarily to scale, and have been somewhat enlarged for the sake of clarity.

Thus, if the receiver detects both pulses, a "normal" inflation is indicated. A single pulse (240) means either that noise has been received, or that the low-level alarm for one wheel is on. These two events can be distinguished by waiting for several successive events. If later a double pulse (240-1) appears, then the single pulse was noise and can be ignored. If no successive double pulse is received within a reasonable time, the alarm can be displayed.

As to the second method that can be employed in coding, it is possible to employ a more complex signalling for the transmission of additional information. One object in such coding is, according to the present invention, the identification of the originating wheel unit or transmitter. It should however, be noted that it is considered to be within the purview of the invention to transmit information of temperature, tire rotation, road conditions, and other factors that should be relayed from the wheel units to the common receiver for the driver's information, as the case may be (not illustrated).

The particular pulse code proposed for the invention identifies one wheel unit 100 out of an array of four or more active wheels, one spare, and two snow tires, as was mentioned earlier. This one-out-of-seven coding is easily accomplished by the use of a three-bit binary code. Referring again to FIG. 14, an additional bit 241 is used to indicate the low level or warning condition. This bit can consequently represent any one of the bits or signals 242 representative of the wheel units which, for purposes of electronic convenience can be identified by the numerals "0" through "7".

It will be understood by those skilled in the art that other coding variations could be worked out to accommodate various numbers of tires, since a number higher than seven may be required on some trucks, by using conventional coding techniques, that are fully compatible with the present invention.

Referring again to the schematic block diagram of FIG. 3, of which a complete circuit is represented by FIG. 13, the transmitter 200 consists of the following main sections: the timing generator or unit constituted by monostable multivibrators 204a, 204b an RF oscillator unit 206, a modulation oscillator unit 210, and a counter 211.

The RF carrier is generated directly by the logic gates 214,215 with an internal feedback loop 221. The frequency of oscillations is set in units 206 by selection of a capacitor 207, for which a preferred value is 470pf, yielding approximately 1.7MHz. The output of the oscillator 206 is a dual-input gate 208 which permits an additional control input 209 for modulation, namely by the oscillator unit 210. The modulated signal is further buffered and sent directly to the earlier explained antenna 152 through the leads or wires 159a, 159b, preferably through a conventional coupling capacitor. For additional power, it will be understood that several output gates (inverters) could be used in parallel, or a separate power output stage could be added.

The modulation oscillator 210 is similar to the RF oscillator 206 but is set to operate at a lower frequency; a capacitor corresponding to 207 in unit 206 has a suggested value of 0.2 μf of which yields about 1 kHz.

Pulses of the modulation square wave are counted up in the counter 211 as they turn on the RF oscillator output to the antenna. The number to be selected in a burst is determined by jumpering at the input to a select gate 212 which, as shown, is a three-input NAND gate. As connected, a count of three is shown in the circuit. The "2" line would be opened by the warning signal, and both opened by the alarm signal for the actual transmitter circuit 202.

After the selected number of pulses has been counted, the output of the gate 212 causes the second multivibrator 204b to clear. This starts the preceding multivibrator 204a which generates the timed interval between transmissions. During this time, the output M2 of multivibrator 204b is low, disabling both the RF and the modulations oscillators 206, 210 and preventing transmission.

At the end of the waiting time, the falling edge of M1 turns on multi-vibrator 204b starting another cycle of transmission.

The outputs 213 and 220 of the second multivibrator 204b are respectively identified as M2 and $\overline{M2}$, while the wire that leads from gate 212 to the vibrator 204b, identified as $\overline{3}$, is the wire 219 (all three having been shown in FIG. 3). Although the circuit and its components are fairly straightforward in FIG. 13, it might be added that both oscillators 206, 210 include at least one two-input NAND gate 214 and a sequence of serially connected inverters 215.

In the counter output circuit, connections are made to the contacts of the pressure or air-mass sensor 102 of FIGS. 5, 5A and 5B where the respective leads 119a, 119c are represented by normally closed contacts going to ground, at wires 119b. It will be understood that the contact or switch between 119a and 119b, if open, results in the "warning" condition, is followed by an inverter 216 similar to 215, and by a pre-select gate 217, before reaching one of the inputs of the gate 212.

In a similar manner, the contact between leads 119b and 119c when opened in the sensor 102 will produce an "alarm" signal that goes through another inverter 218, also reaching an input of the select gate 212. The fail-safe arrangement will be quite clear when considering the selected counter-outputs that go to the select gates 212, the respective contact or switch circuits of the sensor being complete as long as "normal" conditions of air mass exist within the respective tire. The output reading from gate 212 to the multivibrator 204b will be changed accordingly.

It should be repeated that FIG. 13 is included in the inventive system as many times as there are wheel units 100 actively connected in a vehicle, as this of course includes the number of sensors 102, power generators 122, antennas 152, and the circuitry 202. If the alternative power generator 132 or 142 are used, as shown in FIGS. 7A and 8, respectively, their outputs would still feed the "plus" and "ground" lines 139a and 139b, respectively.

These descriptions so far have been related to individual wheel units installed in the tires of the vehicle, while the remaining portion of the description will essentially relate to the common receiver that is preferably mounted in the cab or the driver's position in the vehicle, as is schematically shown in FIG. 1.

The receiver 300 is powered from the vehicle battery, either by a permanent connection or by means of a "cigarette lighter" plug-in connection. Total power drain will be minimal, but it should be noted that the receiver is activated only when ignition is turned on; noting that the electro-magnetic generators in the wheel units do not feed any power to the transmitters until the vehicle is in motion, this will be found to be normal.

Figure 18:
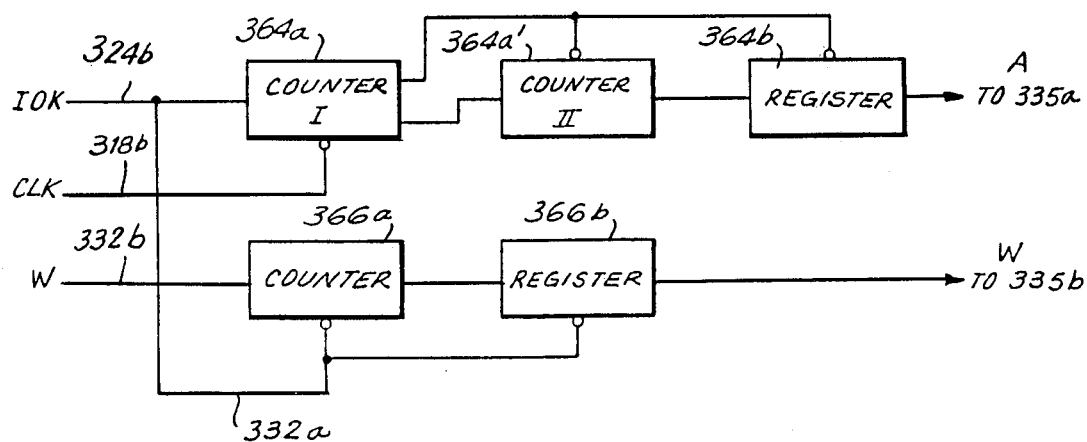
FIG. 18 is an alternative alarm and warning circuit, the indicators having been omitted therefrom.

In its general aspects, the receiver of the inventive monitoring alarm system according to the invention preferably includes means for scanning its input among several antennas, one associated with each wheel or tire, so as to determine whether or not that wheel is producing a coded output, and if so, of what type. While FIG. 4 have a somewhat simplified block diagram of various sections, the FIGS. 15, 15A, 16 and 17 constitute the major sections in more detail. Section 300E was not identified in FIG. 4 as such, since it is common to four or more sections or unit 300D, one being provided for each wheel unit of a vehicle. It is only the circuit of FIG. 17 of which more than one is provided in the common receiver 300, all other circuits or units being required only once. The display 344 at the right-hand end of FIG. 4 appears in FIG. 17 and will be described later in full detail. FIG. 18 is an alternative that can take the place of portion of FIG. 17, however provided only once and not once for each wheel unit, and could thus also be identified as Section "300D'".

It should be noted that the schematic arrangement of FIG. 2 shows only the single antenna 302 forming part of the common receiver 300, while FIG. 15 shows the alternative embodiment wherein individual antennas 302A, 302B, 302C, and 302D are used in close proximity to the active wheels for added strength of reception and for identification of wheel source location of which 302A and 302C were schematically shown in FIG. 1. In section 300A of the common receiver an analog switch 304 successively scans these antennas, but this unit would be omitted if there was but a single antenna 302 as shown in FIGS. 2 and 4. This would then lead, as does the output 304, to the input of an amplifier stage 308.

It will be understood that the sole fixed antenna 302 could be at any, preferably central location of the vehicle, while the individual receiving antennas 302A . . . 302D would be near the splash guards of the wheels, in close proximity with the respective wheel units 100. As was mentioned earlier, the common receiver may be used to beam power to the wheel units, so as to feed their electronic circuits or modules, for example by using the loop antenna system in the power unit 142 (FIG. 8). Such power coupling circuits being conventional, they have not been added to FIG. 15 for the sake of clarity, but will be understood by those skilled in the art.

If multiple antennas are provided, they would be optimally loops of fairly large size, located near each wheel, as explained. It has been found, however, that a ferrite "loopstick" will do, and that the smaller dimension of this arrangement makes for a more convenient mounting package.

Regardless of whether used only for reception of signals for the wheel units, or for both reception and transmission of power to the wheel units, so long as a common frequency is used, a single antenna will do, as was schematically shown in FIG. 3, making the analog switch 304 superfluous, together with other electric circuitry connected therewith that will be explained later. If, however, different frequencies are used, for the transmission of power from and for the reception of signals by the receiver 300 (Section 300A), then two antennas would be most appropriate (not shown), both located at the wheel areas of the vehicle body.

An additional level of switching is required when power is to be supplied from the receiver. This permits the antenna or antennas to serve for the appropriate mode at the correct time. The use of this additional switch (not shown) is required, whether a single or a multiple antenna is used.

The analog switch 304 selects the various antenna inputs, one at a time, as selected by the states of a binary counter 306 associated with an internal decoder which is also a part of 304. A clock oscillator 318 is also associated with these units, having a CLK output 318a and $\overline{CLK}$ output 318b, as shown. It should be remembered that FIG. 15A shows full circuit particulars of the Section 330B, which in FIG. 15 is more schematically shown toward the bottom of the illustration.

The output of the amplifier stage 308 sufficiently avoids noise levels from interfering, and goes to a threshold circuit 310 to operate thereafter a Schmitt trigger 312. Each received individual pulse will operate this unit. In the following, the receiver circuit includes two monostable multivibrators connected in cascade identified as Mono 1 and Mono 2, bearing the reference numbers 314a and 314b, respectively. These provide a delay and a delayed pulse to the condition test logic in Section 300C that appears in FIG. 16. The outputs of the just-described units 312, 314a and 314b, are M2 on line 316a, $\overline{M2}$ on line 316b, $\overline{M1}$ on line 316c, ST on line 316d.

It will be understood that the amplification and band limiting provided in the described circuit elements removes noise and a portion of the interfering signals, so as to allow the RF signal to be detected and applied to the subsequent logic circuits. The amplifier-detector in Section 300A is very similar to an ordinary AM radio receiver. The first portion of the logic determines whether the detector output is in fact a response from a wheel unit. This is done first by examining whether the signal has sufficient amplitude. The Schmitt trigger unit 312 does this satisfactorily. Next, the following pulses are sought. In the simple "double-pulse" system of the invention, the following pulse is looked for at the appropriate time (delayed from reception of the first pulse) by means of a conventional delay and coincidence circuitry to be described later. In the "coded-pulse" system, several successive pulses are sought, again by known logic techniques.

If the triggering event was noise, then the pulses after the first will most likely not be found, and the system would reset to await a valid input. In this case, the "low-level" alarm or "warning" is activated, as will be described, since this condition would truly cause the lack of a second pulse in the double-pulse system.

If a second pulse is found in the latter system, then the condition is normal, with no warning or alarm. If, however, several single pulses are discovered, the alarm is eventually signalled. The time or count condition for this determination is built into the logic.

In the more sophisticated coded-pulse system, the several successive pulses (see FIG. 14, bits 240, 241 and the additional bits 242 between them) must be found to provide wheel identification. If some are found, they must be interpreted. If none are found within the allotted time, the triggering event is assumed to have been noise, and is ignored. The probability of coincident interference in the case of non-switching systems (that is, with the single antenna 302 and without the unit 304) can be computed for any duty cycle ratio. However, for reasons of power efficiency and other considerations, it is desirable to use a very low duty cycle. Typically, the wheel transmitters 200 are on for at most $10^{-3}$ seconds, and off for several seconds. This provides a duty cycle ratio of at least 1000:1 for a single wheel, and at least 300:1 for four wheels. Under these conditions, the probabilities combine as independent events. The chance of interference by full coincidence is very small.

Still, what happens in the event of the interference must be considered. The answer is that either one or the other of the signals will be accepted as valid, or neither will be accepted because of the garbling. This means that one of the expected signals will be missing. Since the wheel transmitters are not designed to be highly stable, it is extremely unlikely that the next pulses will also be coincident, since this would imply tracking in both frequency and phase by two rather crude oscillators. However, should this happen, it would result in a false alarm interpretation by the receiver logic. This is preferable to the opposite, namely not recognizing an alarm which would provide a false sense of security.

One other factor must be considered in the receiver logic. That is, it must also determine when to switch to the next wheel in the switching mode. This is done by means of time and received signals. In other words, the scanning is done on a time assignment basis, except that if a signal is found before the time is up, the receiver is immediately switched to the next channel, so that response can be looked for there. After the last channel has been examined, the control switches back to the first, so that all are considered in rotation.

In the non-switching case, where identification of the wheels is not required, each wheel signal will be received like the others. Here an N out of M decoder is incorporated in the logic to determine whether all wheels are reporting. Since the rate of transmission from the wheels is known, this can be found. By way of explation, it should be added that if the time interval between wheel pulse transmissions is T, for four wheels, the receiver should find four times T acceptable responses in a time period T. In practice, a somewhat longer search interval is used, and proportionately more successes are sought. This minimizes statistical "end effects" and provides greater assurance against noise interference.

For those applications in which transmitter power is taken from the wheel, such as by using the electro-magnetic power generator of FIGS. 6 and 6A, the receiver 300 must not indicate an alarm due to standstill of the vehicle. This is easy and properly solved by the invention since at standstill all alarms would be indicated, presumably a marginal situation, and this condition can be used to disable the outputs.

Referring to Section 300B, simulataeously with the reference to FIGS. 15 and 15A, it will be seen that the interconnections between the binary counter 306 and the decoder 320 are by way of leads 319a and 319b, while the decoded outputs $S_0$ through $S_3$ appear respectively on lines 320a, 320b, 320c and 320d. Further reference will be had to these points as the description proceeds. The lower left-hand portion of FIG. 15A illustrates particulars of the clock oscillator 318, including in a conventional manner, two units with a feed back constituted by the line 318a, and the earlier mentioned outputs 318a and 318b for $\overline{\text{CLK}}$ and CLK, respectively. The first part of the oscillator 318 has an inverter 322 connected to one of its inputs, preceded by a two-input NAND gate 324 to which leads a wire 324a identified as $\overline{\text{IOK}}$, again to be explained later in more detail. It might be added at this point, referring to the earlier discussed FIG. 13, and to all FIGS. 15 through 18 of the receiver, that conventional power, ground, and other connections are schematically shown in the circuit diagrams, which do not require further clarification because they are conventionally used in such circuitry. The values of the capacitors and resistors used in the clock oscillator 318 and other such particulars are conventional and wellknown to those skilled in the art. It should be added for the sake of completeness, that binary counter 306 is connected to analog switch 304 by leads 306a, and 306b as shown.

Figure 16:
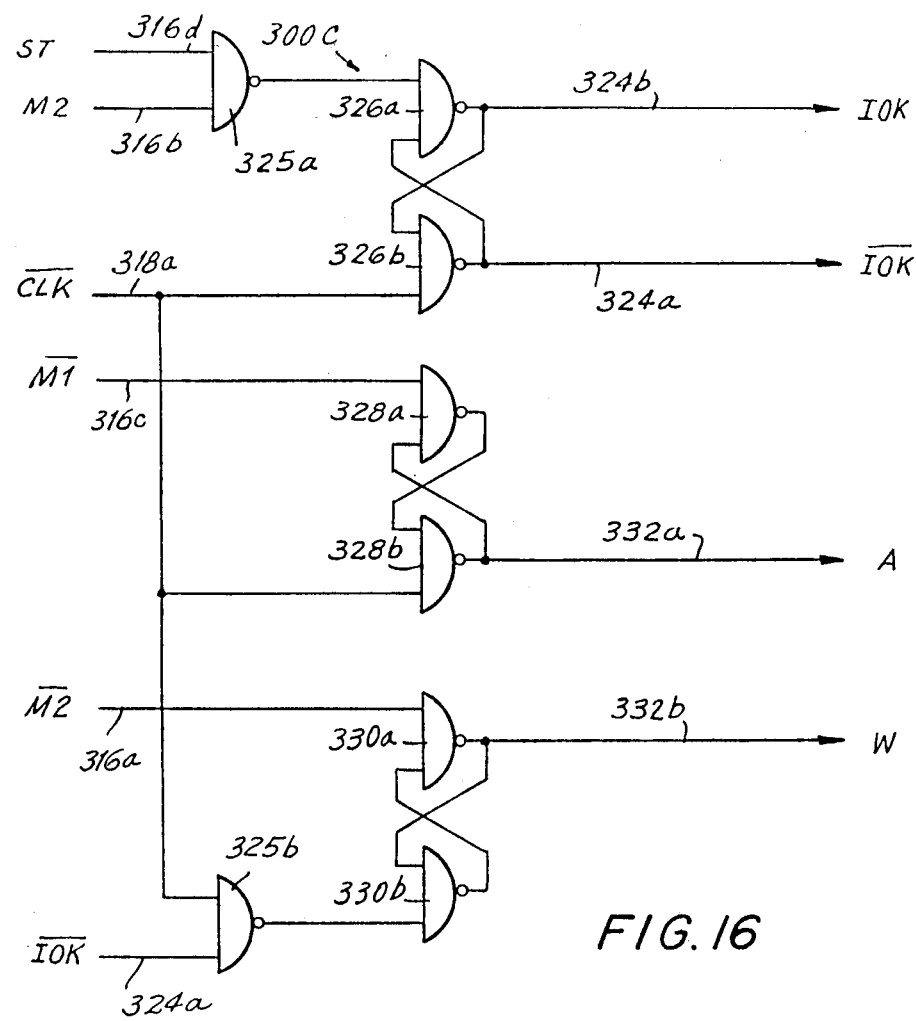
FIG. 16 is a schematic of another receiver section, for condition tests.

FIG. 16 illustrates the condition test logic of Section 300C the inputs of which are fed from the lines that were already identified in FIGS. 15 and 15A. The logic identifications of these wires are believed to be self-explanatory, and need not be repeated herein. Two gates, 325a and 325b, are used, in connection with the signals to generate the required indications "IOK", "A", and "W", standing in the usual manner for "OK, no trouble,", "alarm", and "warning", respectively. Then follows three flip-flops with units 326a, 326b, 328a, 328b, and 330a, 330b therein, as shown. The required output leads are identified as 324a for $\overline{\text{IOK}}$; 322a for A, and 332b for W.

The operation of Section 300C can be described as follows. The condition indicated by Section 300A is stored in one of the flip-flops. If the second pulse is present, IOK comes on. This is cleared by the next clock but is on at the start of the clock, (if it comes on at all), and therefore will be gated into the output registers. It should be noted that since IOK will also be used to terminate the present state, it will not last long. There must be sufficient IOK time to prime the output store or memory, namely by adding gates if necessary for more delay, which is considered to be a conventional expedient although not shown in detail.

Alarm A is set "high" at the beginning of a step, if it was not "high" already. If no M1 is received during the step, A remains "high" and will be "high" at the next clock pulse. Any reception will generate M1, and hence clear the alarm for this current step.

Warning indicates lack of a second pulse of the two-bit signal, as was explained. This register is cleared at the start of each step by CLK. Any reception sets W, but an IOK re-clears it. This will trigger a false count at the output, but the following IOK will clear the output completely. If there is no IOK, then the output is of course properly counted.

The clock oscillator 318 is counted up in counter 306 and decoded in units 320 to produce the four states $S_0 \ldots S_3$ that correspond to the four wheel units being tested. These are the outputs appearing to the left-hand side of the decoder 320 in FIG. 15, and will be used for every section 300D, left-hand bottom corner in the respective unit for individual signalling of the particular wheel unit.

The Section 300D shown in FIG. 17 is repeated as many times as there are wheel units 100 to be monitored. The multiplexed inputs to the units of FIG. 17 are the earlier explained lines 332a for A, 332b for W, and 324b for IOK, each of the sections 300D having an additional input 320a ... 320d as derived from the decoder 320, and explained earlier (see FIGS. 15 and 15A). In a proper combination, these inputs are combined in gates 333a, 333b and 333c, the outputs of which lead to two substantially similar units, for "alarm" and "warning" respectively, including in the former a counter 334a and register 334b, and in the latter a similar counter 336a and a register 336b. Only those A and W signals are counted in the Sections 300D that correspond to the respective steps. These reach the counters, and if they fill up, the respective register trips, indicating that several successive A or W signals have been received for that section or tire.

Through input leads 335a and 335b to be mentioned later for other purposes, output gates 338a and 338b are accessed, again one for "alarm" and one for "warning", followed by a two-input NOR gate 340, and then leading to a driver inverter 342.

Each section 300D has an indicating light-emitting diode 344 at its output, respectively identified as $L_0 \ldots L_3$, for indicating failure in the wheel unit concerned, in accordance with the respective inputs 320a ... 320d that characterizes this section.

FIG. 17A shows a circuit to produce "LL" and "FL" inputs 350, 354, respectively, that constitute the second inputs of the gates 338a and 338b, respectively. This circuit is required to have the light-emitting diodes flash in the "warning" mode while for "alarm" the indication will be steady. Signals are taken for this circuit from respective alarm inputs $A_0 \ldots A_3$, brought in by way of wires 346a ... 346d, and processed through a NAND gate 348, as shown. A flash oscillator 352 connects to the wire 350 to produce the intermittant or flashing light at the output 354.

As mentioned before, if all four alarms are set, it is assumed that the vehicle is not moving, and both display conditions (A and W) are suppressed. This is done by the gate 348 which disables LL and holds the oscillator 352 so that FL is low if all four alarms are present.

The ultimate output of the inventive system can be used in a variety of ways. It may sound an audible alarm for the "alarm" or danger condition, and to light the indicators for the "warning" condition. Various combinations of flashing, blinking, steady indication, etc., can be used, or the output can be used to operate a recorder, an emergency transmitter, etc. The described solution is only one of various modifications and possibilities that are believed to be within the scope of the invention.

An alternative embodiment shown in FIG. 18 uses a single display for all wheels. Here the "warning" section is identical with the general one described above. The inputs 324b for IOK, 318b for CLK and 332b for W are the same or similar to those used at the inputs of the four sections of FIG. 17. The "warning" section is similar to that of FIG. 17, with a counter 366a and a register 366b. Any single pulse will trigger and any IOK will cancel it. The alarm section (top of FIG. 18) is different. The IOK's are counted up by a counter 364a cleared by a signal from the clock line 318b. Unless the proper number is received, a $\overline{Q}$ output of the counter remains high at the end of the consideration time, and this will be transferred to a following counter 364a' when the clock clears the input timer. The balance of the action is as before, using a register 364b that is similar to 334b of FIG. 17. Receipt of a "good" transmission (Q going high) clears the counter and the register of A. In this way, if one of the four signals is an alarm, the section A will be activated, but it will clear automatically if this was a noise or if the alarm condition is later corrected.

It will be noted that the outputs of the respective A and W registers 364b, 366b lead to wires 335a and 335b, respectively as shown to the right-hand side of FIG. 17, from whereon the gates, the NOR gate, the driver, and the light-emitting diode or other output indication can be the same.

Instead of the arrangement shown in FIG. 17, there could be eight output registers to cover "warning" and "alarm" conditions for the four wheels, indentified throughout the application with numerals 0, 1, 2 and 3. Each of the registers has a counter that adds up the "hits" for its channel, at each clock pulse. Receipt of an IOK signal clears the counter, as in the previously described circuit. After receipt of an appropriate number of "alarms", an output register is set and locked. This is cleared only by an IOK signal. The "W" channel registers are "flashed" via their output enable lines. As in FIG. 17, the alternative (not illustrated) output-register embodiment could have the steady (A) and flashing (W) commands combined in a NOR gate, with an inverting driver to operate an LED. There would be four LED's, preferably mounted on the dashboard. There are three more aspects of the invention that should be described. First, the transitter 200 of FIG. 13 can be made to constitute a test generator, substantially with the same circuit, but also including a simplified, short-range receiver. This modification should preferably have power transmitting means therein, to work with receiving looped antennas of the wheel units, so that check-ups can be made while the vehicle is stationary.

In order to provide an external means of determining whether or not the wheel units are working, the sensor unit 102, FIG. 19, within the wheel 500 of the vehicle 501 could be excited by a hand-held antenna/transmitter test unit 502. The beamed power would excite the sensor unit 102 in question, to make the same transmit, and the built-in receiver, with a simplified logic circuit, could detect the presence or absence of the signal. For this reason, the invention contemplates that all wheel units should have provision, even if only as an alternate, to use received RF power for transmission in a stationary condition.

The hand-held test unit 502 consists of a handle portion 503 suitably roughened to provide a grip and a portion 504 carrying a power transmission unit similar to that of FIG. 8A and a receiver unit similar to that of FIG. 4 (omitting the parts 300D and 344) to excite an "IOK" light 505 or a "warning" light 506 located in an exposed position in the end of the handle portion 503. Power is supplied to the test unit by a self-contained battery, from the vehicle's electrical system by means of a plug insertable into a cigarette lighter plug or by a voltage reduced commercial power line, all as generally known in the art.

Power supplied to the test unit 502 is converted into a convenient frequency signal (RF or lower) to excite the sensor unit 102 of the tire. Depending on the power option used in the tire, the signal produced by the test unit is received by the wheel unit receiving antenna, a separate antenna provided for the purpose or by the coil of the electromagnetic generator. The resulting pressure produced signal generated within the tire by the sensor unit 102 is picked up by the receiver unit in the test unit 502 to operate the normal "IOK" light 505, the "warning" light 506 or no signal is generated. In the event of no signal, a malfunction of the equipment is indicated or a low tire inflation level is indicated.

In some cases it is desired to have wheel identification and yet not to wire into the vehicle electrical system. For these applications, a passive transponder 600 can be used in accordance with FIGS. 21 to 23. This device derives its power from a transmitted signal from the receiver location. It is physically close to the wheel, so that it can receive the wheel signal, modify the same, and re-transmit it back to the receiver. In this way, identification about the wheel signal is coded even though the wheel transmitters are all identical.

A transponder 600 is located adjacent each wheel 601 of the vehicle. The wheels 601 are similar to but not restricted to the wheels 100 and 102 previously described. In the case of a 4-wheel vehicle, there is a transponder for each wheel 601 of the vehicle all reporting back to a central receiver 602 mounted on the dashboard of the vehicle. The transponders 600 are mounted on the chassis of the vehicle (for example, on the adjacent fender) and each operates at a slightly different RF frequency to operate a selected signal of the central receiver 602 (similar to but not restricted to the receiver 300 previously described) to properly indicate which wheel tire is under-inflated.

Figure 21:
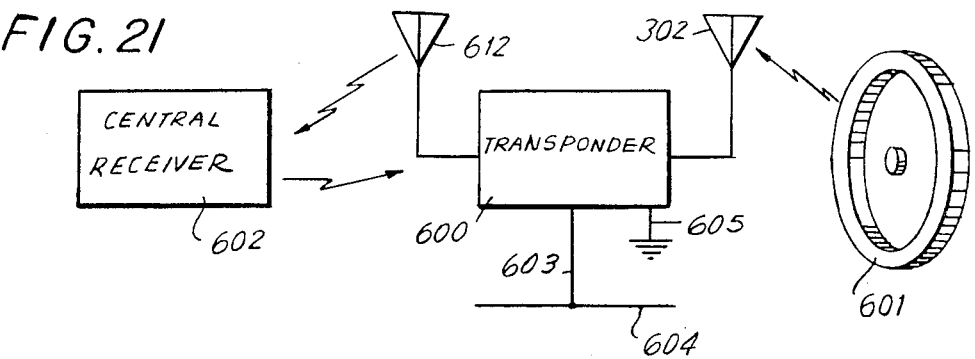
FIG. 21 is a schematic illustration of a separate transponder unit for sensing tire pressure.
Figure 22:
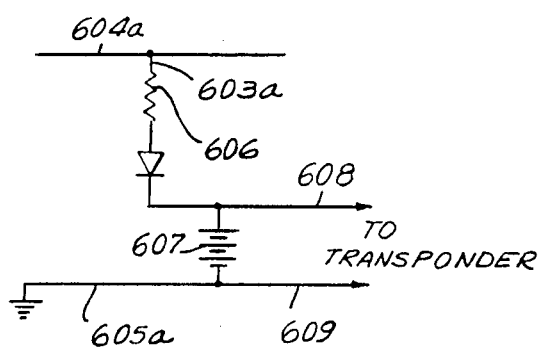
FIG. 22 is a schematic diagram of an alternate power source for the transponder of FIG. 21.
Figure 23:
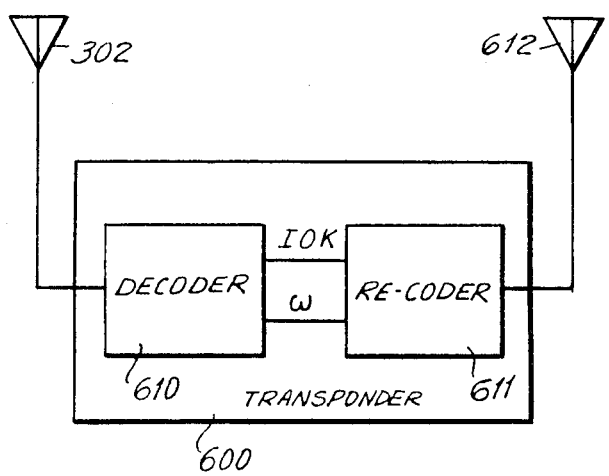
FIG. 23 is a detailed schematic diagram of the transponder of FIG. 21.

As shown in FIG. 21, the transponder 600 is energized by a positive line 603 being connected to an adjacent continuously energized wire 604 of the vehicle's electrical system. A negative line 605 from the transponder 600 is grounded to complete the circuit or grounding can be accomplished by the mounting of the transponder directly onto the metal of the chassis. As shown in FIG. 22, the positive line 603a can be connected to wire 604a of the vehicle's electrical system which is not always energized; i.e. a light wire. In this case a limiting resistor and diode 606 and a storage battery 607 are connected in series between the positive line 603a and the grounded negative line 605a. This causes the battery 607 to be charged when the line 604a is in use to supply power through the lines 608 and 609 to the transponder 600. Alternatively, the transponder 600 could be powered by transmission of an RF or lower frequency signal from the central receiver station 602 by means of an oscillator/antenna such as that described in connection with FIG. 8A.

The modulation may take place in a number of forms. One method is to use a decoder 610 which receives a signal from the sensor unit 102 of the transmitter 601 (similar to but not restricted to the transmitter 200 previously described) picked up by antenna 302, as previously described. In accordance with the signal received, the decoder 610 generates an "IOK" signal or a "warning" signal or no signal to a re-coder 611 which in turn sends the signal to the central receiver over the sending antenna 612. Other types of code re-transmission could be used as well.

Various types of transponders can be used in accordance with the invention, in which the signal is remodulated, and to a different frequency, or the signals altered in time as they pass through the transponder 600 in order that the wheel identification information is added to them.

It will be understood by those skilled in the art that the present, rather sophisticated invention admits of various modifications, changes, simplifications, and additions which are all considered to be within the scope of the basic inventive concept. Several modifications, additions, changes, and combinations are possible, as have been indicated and described in several respects, while the illustrated and described embodiments are considered to be nearly preferred, exemplary embodiments. The desired scope of protection should not be construed as being limited by the preferred embodiments, and similarly some of the more sophisticated logic may be omitted in some applications.

We claim:

1. An alarm system for monitoring a pressurized vehicle tire for its air mass comprising in combination, an air mass monitoring sensor within the tire for sensing mass of air within the tire and adapted to produce a continuous signal responsive to mass of air within the tire under normal and abnormal tire inflation conditions, a transmitter within the tire for transmitting a signal produced by the air mass sensor, a power generator within the tire activated by rotation of the tire for generating power for the transmitter and an antenna within the tire by which the signal transmitted to the transmitter may be radiated to a receiver located exterior of the tire.

2. An alarm system according to claim 1 including in addition a receiver located exterior of the tire adapted to receive a signal transmitted by the receiver and where said receiver includes signal decoding and alarm circuit means for displaying a warning condition and an alarm condition.

3. An alarm system according to claim 1 for each pressurized tire of a vehicle having a plurality of pressurized tires and having in addition a common receiver means located exterior of the tires for receiving signals from the transmitting means associated with each tire wherein each said transmitting means and said receiver have respective binary encoding and decoding means to provide indication of high or low air mass values in individual ones of said tires.

4. An alarm system according to claim 1 for each pressurized tire of a vehicle having a plurality of pressurized tires and having in addition a receiver located exterior of the tires including separate receiving antennas corresponding to the number of said tires with each receiving antenna being secured to the vehicle body in a location adjacent to a tire to form a close coupling with an antenna within the tire.

5. An alarm system according to claim 1 wherein said transmitter includes means for intermittently but continuously transmitting a two-bit signal when the air mass monitored by the air mass sensor is within predetermined limits, the absence of one of the two bits being indicative of a warning condition and the absence of both bits being indicative of an alarm condition.

6. An alarm system according to claim 1 including in addition an override circuit to prevent generation of false signals.

7. An alarm system according to claim 1 including a hand-held sensing unit having a built-in receiver capable of being positioned in the vicinity of the tire to receive the signal transmitted by the transmitter.

8. An alarm system according to claim 1 for each pressurized tire of a vehicle having a plurality of pressurized tires and having in addition a transponder for each tire mounted on a vehicle adjacent the tire to monitor signals transmitted by the transmitter in the adjacent tire wherein each transponder is adapted to send a different signal to a central receiver mounted on the vehicle.

9. An alarm system according to claim 8 having in addition a continuously energized wire connected to the vehicle's electrical system and to each transponder to energize the same.

10. An alarm system according to claim 8 having in addition a storage battery wherein each transponder is energized by the storage battery with the storage battery being in a circuit including an intermittently energized wire of the vehicle's electrical system and a resistor diode.

11. An alarm system according to claim 8 wherein power to said transponders is provided by an electromagnetic coupling from a source located on a stationary part of the vehicle.

* * * * *